(12) United States Patent
Minami et al.

(10) Patent No.: US 7,903,927 B2
(45) Date of Patent: Mar. 8, 2011

(54) EDITING APPARATUS AND CONTROL METHOD THEREOF, AND PROGRAM AND RECORDING MEDIUM

(75) Inventors: Miyuki Minami, Kanagawa (JP); Shota Yoshinaka, Kanagawa (JP); Hayato Yoshimori, Kanagawa (JP); Jeffrey Allen Osborn, Palafine, IL (US)

(73) Assignee: Sony Corporation, Tokyo (JP)

( * ) Notice: Subject to any disclaimer, the term of this patent is extended or adjusted under 35 U.S.C. 154(b) by 1094 days.

(21) Appl. No.: 11/175,472

(22) Filed: Jul. 6, 2005

(65) Prior Publication Data

US 2006/0008247 A1    Jan. 12, 2006

Related U.S. Application Data

(60) Provisional application No. 60/586,978, filed on Jul. 8, 2004.

(51) Int. Cl.
*G11B 27/00* (2006.01)
*H04N 9/00* (2006.01)

(52) U.S. Cl. .............................................. 386/52; 386/4
(58) Field of Classification Search .................... 386/52
See application file for complete search history.

(56) References Cited

U.S. PATENT DOCUMENTS

| 6,670,966 | B1 * | 12/2003 | Kusanagi ..................... 715/723 |
| 2003/0142955 | A1 * | 7/2003 | Hashizume et al. .......... 386/52 |
| 2003/0146915 | A1 * | 8/2003 | Brook et al. .................. 345/473 |

* cited by examiner

*Primary Examiner* — Marsha D Banks Harold
*Assistant Examiner* — Oluwaseun A Adegeye
(74) *Attorney, Agent, or Firm* — Frommer Lawrence & Haug LLP; William S. Frommer; Thomas F. Presson

(57) ABSTRACT

A plurality of video materials specified from video materials is managed as one group. Information associated with each video material belonging to the group is displayed on a graphical user interface according to a first operation. According to a second operation, a process to add video material or delete video material specified from the video materials belonging to the group is performed. The contents of a special effect set for the video material specified from the video materials belonging to the group are managed in correspondence with only the video material.

13 Claims, 24 Drawing Sheets

EDITING APPARATUS AND CONTROL METHOD THEREOF, AND PROGRAM AND RECORDING MEDIUM

This application claims the priority benefit of U.S. Ser. No. 60/586,978 filed on Jul. 8, 2004, the entirety of which is hereby incorporated by reference herein.

BACKGROUD OF THE INVENTION

1. Field of the Invention

This invention relates to an editing apparatus and control method thereof, and program and recording medium and suitably applied to a nonlinear editing apparatus.

2. Description of the Related Art

Conventionally, television broadcasting stations record concerts and sports with a plurality of television cameras. For the taped broadcasting of such concerts and sports or for using them in news, single edited video/audio is created by editing video and audio captured by the plurality of television cameras.

In this case, in editing work, video and audio captured by the plurality of television cameras are taken in an editing apparatus as clips, desired video/audio parts are extracted from the clips and arranged on a single time line, and video special effects and audio mixing are set to desired positions.

Conventionally, editing apparatuses have been proposed, which manage as one group clips of video and audio obtained through recording with a plurality of television cameras so as to allow editing work. With the editing apparatuses, editing work with a plurality of clips can be done efficiently, the plurality of clips having the same time passage and recorded by a plurality of television cameras.

In the editing apparatuses, however, after a group clip is created, new clips cannot be added to the group clip and clips cannot be deleted from the group clip.

Therefore, there exists a problem in that, if clips other than clips belonging to a group clip for creating edited video/audio, the editing result from the start should be all discarded and the creation of a new group clip should be started again.

In addition, due to difference in camera property of television cameras, subtle color difference may be generated in the video of clips connected by editing. In this case, it is desired that color is adjusted on a clip basis. The conventional editing apparatuses, however, cannot adjust color for each of clips belonging to a group clip. This is a problem.

SUMMARY OF THE INVENTION

In view of foregoing, an object of this invention is to propose an editing apparatus and control method thereof, and program and recording medium capable of improving working efficiency of editing work.

The foregoing objects and other objects of the invention have been achieved by providing an editing apparatus with: a management means for managing as one group a plurality of video materials specified out of video materials; and a display means for displaying information on each video material belonging to the group as a graphical user interface according to first operation. The management means is designed to execute a process to add a new video material to the group or delete a video material specified out of the video materials belonging to the group, and manage the contents of special effects set for a video material specified out of the video materials belonging to the group in correspondence with the video material, according to second operation.

As a result, with this editing apparatus, the addition/deletion of clips belonging to a group and the setting of various special effects for clips belonging to the group can be performed as desired and further, these processes can be performed on the graphical user interface with good operability and visibility.

Further, this invention provides a editing method of an editing apparatus with: a first step of managing as one group a plurality of video materials specified out of video materials; a second step of displaying information on each video material belonging to the group as a graphical user interface according to first operation; and a third step of executing a process to add a new video material to the group or delete a video material specified out of the video materials belonging to the group, and managing the contents of special effects set for a video material specified out of the video materials belonging to the group in correspondence with the video material, according to second operation.

As a result, with the editing method of the editing apparatus, the addition/deletion of clips belonging to a group and the setting of special effects for clips belonging to the group can be performed as desired and further, these processes can be performed on the graphical user interface with good operability and visibility.

Furthermore, this invention provides a program to cause a computer to execute: a first step of managing as one group a plurality of video materials specified out of video materials; a second step of putting and displaying information on each video material belonging to the group as a graphical user interface according to first operation; a third step of executing a process to add a new video material to the group or delete a video material specified out of the video materials belonging to the group; and a fourth step of managing the contents of special effects set for a video material specified out of the video materials belonging to the group, in correspondence with the video material, according to second operation.

As a result, with this program, the addition/deletion of clips belonging to a group or the setting of special effects for clips belonging to the group can be performed as desired and further, these processes can be performed on the graphical user interface with good operability and visibility.

Furthermore, this invention records a program in a recording medium, the program causing a computer to execute processes including: a first step of managing as one group a plurality of video materials specified out of video materials; a second step of displaying information on each video material belonging to the group as a graphical user interface according to first operation; a third step of executing a process to add a new video material to the group or delete a video material specified out of the video materials belonging to the group; and a fourth step of managing the contents of special effects set for a video material specified out of the video materials belonging to the group in correspondence with the video material, according to second operation.

As a result, with this recording medium, the addition/deletion of clips belonging to a group and the setting of special effects for clips belonging to the group can be preformed as desired and further, these processes can be performed on the graphical user interface wit good operability and visibility.

As described above, according to this invention, a plurality of video materials specified out of video materials is managed as one group, information on each video material belonging to the group is displayed as a graphical user interface according to first operation, and according to second operation, a process to add a new video material to the group or delete a video material specified out of the video materials belonging to the group is executed and the contents of special effects set for a video material specified out of the video materials belonging to the group are managed in correspondence with the video material. Therefore, the addition/deletion of clips belonging to the group and the setting of special effects for clips belonging to the group can be performed as desired and further, these processes can be performed on the graphical user interface with good operability and visibility, thus making it possible to an editing apparatus and control method thereof, and program and recording medium capable of improving editing efficiency.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
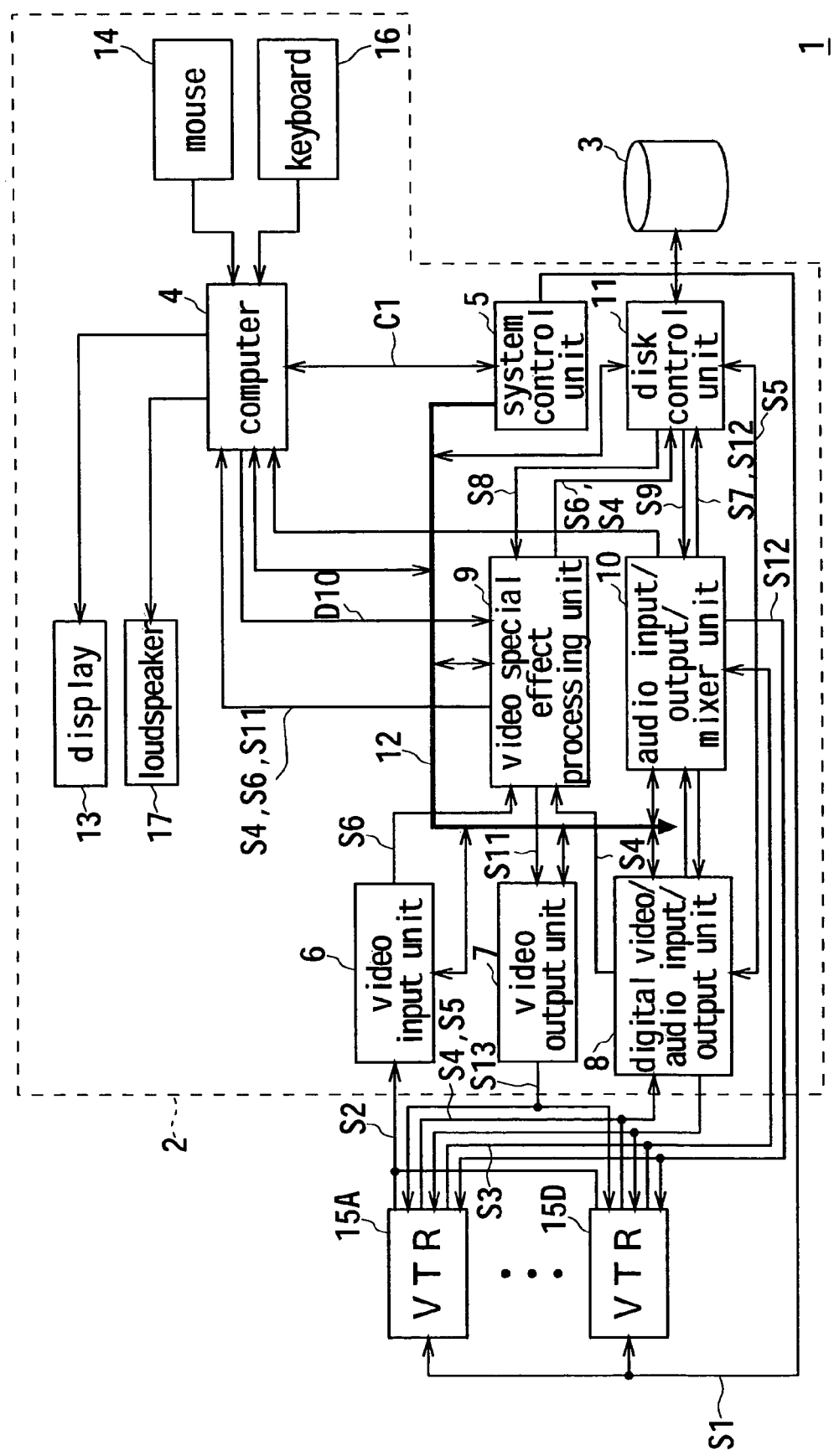
FIG. 1 is a block diagram showing an entire construction of an editing system according to this embodiment.

Preferred embodiments of this invention will be described with reference to the accompanying drawings:

Referring to FIG. 1, reference numeral 1 shows an editing system according to this embodiment and is desired to be capable of taking part or all of video and audio recorded on a videotape, in a memory device 3 of a large capacity comprising Redundant Arrays of Independent Disks (RAIDs) as clips via an editing apparatus 2.

In addition, this editing system 1 is designed to be capable of creating an edit list specifying edit details to obtain desired edited video and audio, by desirably connecting clips, which has been taken in the memory device 3, actually executing editing processes according to the created edit list, and storing or recording the obtained edited video and edited audio in the memory device 3 or on a videotape.

In the case of this editing system 1, the editing apparatus 2 is composed of a computer 4, a system control unit 5, a video input unit 6, a video output unit 7, a digital video/audio input/output unit 8, a video special effect processing unit 9, an audio input/output/mixer unit 10, and a disk control unit 11, which are connected to each other via a control bus 12.

In this case, the computer 4 displays on a display 13 a prescribed window (hereinafter, this is referred to as a clip taking window) to take video and audio recorded on a videotape in the memory device 3, according to user operation. When a mouse 14 is operated in this situation and a playback command for a videotape recorder 15A to 15D out of a plurality of videotape recorders 15A to 15D being connected to the editing apparatus 2 is entered, the computer 4 sends a control command C1 according to this matter to the system control unit 5.

The system control unit 5 sends a control signal S1 to the corresponding videotape recorder 15A to 15D based on the control command C1 given from the computer 4, so as to perform playback operation on the video signal and audio signal recorded on the videotape.

As a result, this videotape recorder 15A to 15D outputs an analog video signal S2 and analog audio signal S3 or a digital video signal S4 and digital audio signal S5 reproduced from the videotape, gives the analog video signal S2 and analog audio signal S3 to the video input unit 6 or the audio input/output/mixer unit 10, respectively, and gives the digital video signal S4 and digital audio signal S5 to the digital video audio input/output unit 8.

At this time, the system control unit 5 controls the video input unit 6 and the audio input/output/mixer unit 10, or the digital video/audio input/output unit 8, via the control bus 12 so as to take therein the analog video signal S2 and analog audio signal S3, or the digital video signal S4 and digital audio signal S5 output from the videotape recorder 15A to 15D.

When the analog video signal S2 is taken in via the video input unit 6, this signal S2 is converted into a digital signal through the video input unit 6 and is given to the video special effect processing unit 9 as a digital video signal S6. When the digital video signal S4 is taken in via the digital video/audio input/output unit 8, this signal S4 is given to the video special effect processing unit 9 as it is.

The video special effect processing unit 9 sends the digital video signal S6, S4, which has been received from the video input unit 6 or the digital video/audio input/output unit 8, to the computer 4 under the control of the system control unit 5. Thus video based on the digital video signal S6, S4 is displayed at a prescribed position on the clip taking window on the display 13 under the control of the computer 4.

When the analog audio signal S3 is taken in via the audio input/output/mixer unit 10, on the other hand, this signal S3 is converted to a digital signal through the audio input/output/mixer unit 10 and is given to the computer 4 as a digital audio signal S7. When the digital audio signal S5 is taken in via the digital video/audio input/output unit 8, this signal S5 is given to the computer 4 via the audio input/output/mixer unit 10 as it is. Thus audio based on the digital audio signal S7, S5 is output from the loudspeaker 17 of the computer 4.

Therefore, the operator can specify desired parts of the video and audio with the mouse 14 and the keyboard 16, based on the video being displayed on the display 13 and the audio being output from the loudspeaker 17. In addition, the operator can treat them as clips and register management information on each clip in a clip management information database in the computer 4, the management information including the time codes of the IN-point and OUT-point, material length (duration), clip ID, clip name, captured date and time of the video and audio, and created date and time of the clip.

When the computer 4 receives a command for taking in a clip, it sends the system control unit 5 a control command C1 according to this command.

In response to the received control command C1, the system control unit 5 sends the control signal S1 to a corresponding videotape recorder 15A to 15D, so that the videotape recorder 15A to 15D playbacks the video and audio of the specified clip. In addition, the system control unit 5 controls the video input unit 6 and the audio input/output/mixer unit 10, or the digital video/audio input/output unit 8 via the control bus 12 so as to take therein the analog video signal S2 and analog audio signal S3 or the digital video signal S4 and digital audio signal S5 output from the videotape recorder 15A to 15D.

When the analog video signal S2 is taken in via the video input unit 6, this signal S2 is converted into a digital signal through the video input unit 6 and is given to the disk control unit 11 via the video special effect processing unit 9 as a digital video signal S6. When the digital video signal S4 is taken in via the digital video/audio input/output unit 8, this signal S4 is given to the disk control unit 11 via the video special effect processing unit 9 as it is.

When the analog audio signal S3 is taken in via the audio input/output/mixer unit 10, this signal S3 is converted into a digital signal through the audio input/output/mixer unit 10 and is given to the disk control unit 11 as a digital audio signal S7. When the digital audio signal S5 is taken in via the digital video/audio input/output unit 8, this signal S5 is given to the disk control unit 11 as it is.

Then the disk control unit 11 sequentially taken in the digital video signal S6, S4, given from the video special effect processing unit 9, and the digital audio signal S7, S5, given from the audio input/output/mixer unit 10 or the digital video/audio input/output unit 8, according to the command given from the system control unit 5 via the control bus 12, and gives them to the memory device 3 to record them at specified addresses.

As described above, the editing apparatus 2 can playback the video and audio of a specified clip from a videotape and take them in the memory device 3.

On the other hand, the operator can display a prescribed window (hereinafter, referred to as a time line window) to perform editing process on the display 13 with prescribed operation. On this time line window, the operator can create as an edit list edited data specifying edit details indicating which clip and which clip are joined in what order. In addition, the operator can confirm edited video and edited audio based on the edit list after reproducing the edit list or during creating the edit list.

When the computer 4 receives a command for registering the edited data via the mouse 14 after an edit list is created, it stores all the edited data according to a user program set in the edit list as a file in the memory device 3.

On the contrary, when the computer 4 receives a preview command of edited video and audio based on an edit list via the mouse 14 or the keyboard 16 after or during creating the edit list, it sends a control command C1 according to this command to the system control unit 5.

The system control unit 5 controls the disk control unit 11 via the control bus 12 according to the received control command C1, so as to read the digital video signal S6, S4 and the digital audio signal S7, S5 of required clips, from the memory device 3. Then the digital video signal S6, S4 read from the memory device 3 is given to the video special effect processing unit 9 as a reproduced digital video signal S8, and the digital audio signal S7, S5 read from the memory device 3 is given to the audio input/output/mixer unit 10 as a reproduced digital audio signal S9.

At this time, the video special effect processing unit 9 performs, according to necessity, specified special effect processing on the received reproduced digital video signal S8 under the control of the system control unit 5. In addition, the video special effect processing unit 9 inserts or superimposes video data D10 for a title or various graphics, which is given from the computer 4 according to necessity, in the reproduced digital video signal S8 of each clip, and sends the obtained digital edited video signal S11 to the computer 4.

The audio input/output/mixer unit 10 performs, according to necessity, mixing on the given reproduced digital audio signal S9 under the control of the system control unit 5, and sends thus obtained digital edited audio signal S12 to the computer 4.

Then the computer 4 displays edited video base don the digital edited video signal S11 given from the video special effect processing unit 9, at a prescribed position in the time line editor window being displayed on the display 13, and outputs audio based on the digital edited audio signal S12 given from the audio input/output/mixer unit 10, from the loudspeaker 17. Therefore, with this editing apparatus 2, the operator can do editing work with the computer 4 while confirming edited video and edited audio based on an edit list.

Further, when the computer 4 receives an execution command of an edit list via the mouse 14 or the keyboard 17 after creating the edit list, it sends a control command C1 according to this command to the system control unit 5.

The system control unit 5 controls the disk control unit 11 via the control bus 12 based on the received control command C1, so as to read the digital video signal S6, S4 of clips which are used for the editing process, from the memory device 3 and send it to the video special effect processing unit 9 as a reproduced digital video signal S8 and to read the digital audio signal S7, S5 of the clips from the memory device 3 and send it to the audio input/output/mixer unit 10 as a reproduced digital audio signal S9.

Then the video special effect processing unit 9 performs, according to necessity, special effect processing on the received reproduced digital video signal S8 of the clips and sends the obtained digital edited video signal S11 to the disk control unit 11 or the video output unit 7, under the control of the system control unit 5, similarly to the above-described preview mode case. The video output unit 7 converts the received digital edited video signal S11 into an analog signal and sends the obtained edited video signal S13 to a corresponding videotape recorder 15A to 15D under the control of the system control unit 5.

At this time, the audio input/output/mixer unit 10 performs, according to necessity, editing process such as mixing and analog conversion on the received reproduced digital audio signal S9 of the clips, and sends the obtained edited audio signal S12 to the disk control unit 11 or a corresponding videotape recorder 15A to 15D, under the control of the system control unit 5, similarly to the above-described preview mode case.

Thus the disk control unit 11 stores the received digital edited video signal S8 and edited audio signal S12 at specified addresses of the memory device 3, under the control of the system control unit 5. In addition, the videotape recorder 15A to 15D records the edited video signal S13 given from the video output unit 7 and the edited audio signal S12 given from the audio input/output/mixer unit 10, at a specified position of a videotape, based on the control signal S1 given from the system control unit 5.

As described above, with this editing apparatus 2, the video and audio of specified clips are edited and processed into specified states, and stored in the memory device 3 or recorded on a videotape, based on a created edited list.

(2) Construction of Computer 4

Figure 2:
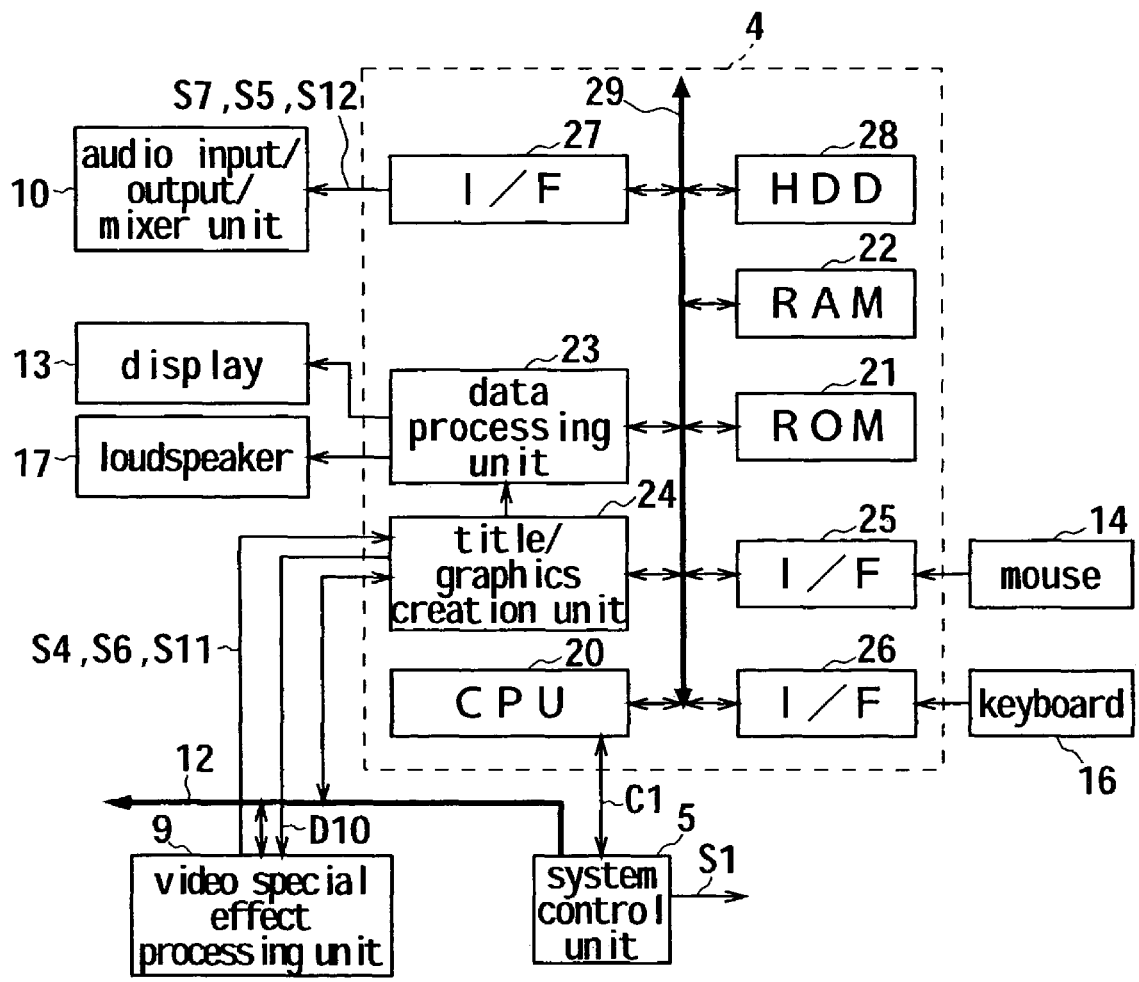
FIG. 2 is a block diagram showing a construction of a computer.

Referring to FIG. 2, the computer 4 is composed of a Central Processing Unit (CPU) 2, a Read Only Memory (ROM) 21, a Random Access Memory (RAM) 22, a data processing unit 23, a title/graphics creation unit 24, interface circuits 25 to 27, and a hard disk drive 28, which are connected to each other via a CPU bus 29. The computer 4 is connected to the mouse 14, the keyboard 16 and the audio input/output/mixer unit 10 via the interface circuits 25, 26, 27.

In this case, based on a program being stored in the ROM 21, the CPU 20 reads video data being stored in the hard disk drive 28 according to necessity, and gives this to the display 13 via the data processing unit 23, thereby displaying on the display 13 various windows, various dialogs, a cursor moving in response to mouse operation, and numeric letters and letters entered via the keyboard 16.

In addition, the CPU 20 gives the digital video signal S6, S4 and the digital edited video signal S11 given from the video special effect processing unit 9, to the data processing unit via the title/graphics creation unit 24, thereby displaying a moving picture and still picture based on the digital video signal S6, S4 or the digital edited video signal S11 at prescribed positions on a window. In addition, the CPU 20 converts the digital audio signal S7, S5 and the edited audio signal S12 given from the audio input/output/mixer unit 10, into an analog signal through the data processing unit 23 and gives the resultant to the loudspeaker 17, thereby outputting audio based on the digital audio signal S7, S5 or the edited audio signal S12 from the loudspeaker 17.

Further, when the CPU 20 receives an execution command of a prescribed process via an interface circuit 25, 26 via the mouse 14 or the keyboard 16, it sends a control command C1 to the system control unit 5, according to necessity, based on a program being stored in the ROM 21, thereby operating, as desired, a corresponding videotape recorder 15A to 15D, the video input unit 6, the video output unit 7, the digital video/audio input/output unit 8, the video special effect processing unit 9, the audio input/output/mixer unit 10, and/or the disk control unit 11, via the system control unit 5. Thus the editing system 1 can execute various processes described above.

Furthermore, the CPU 20 controls the title/graphics creation unit 24, according to necessity, based on a program being stored in the ROM 21 to create the video data D10 for a title and graphics and sends this to the video special effect processing unit 9, thereby reflecting the title and graphics in edited video.

(3) Edit List Creation Procedure in Computer 4

Next an edit list creation procedure in the computer 4 will be described.

With the computer 4, an edit list is created by specifying desired video and audio parts of desired clips being stored in the memory device 3, setting a sending order of cut video by sequentially arranging them on a time line, and setting video special effect processes and audio mixing process and inserting a title.

Information (EDL information) on thus created edit list, such as the time codes of IN-point and OUT-point of each cut, an arrangement order of cuts, an edit list name, a creator and a created date and time, information on the contents of video special effects and audio mixing set in this edit list, and various kinds of information on working environments when the edit list was created are stored in a file, and registered and managed as "project" in the hard disk drive 28.

Figure 3:
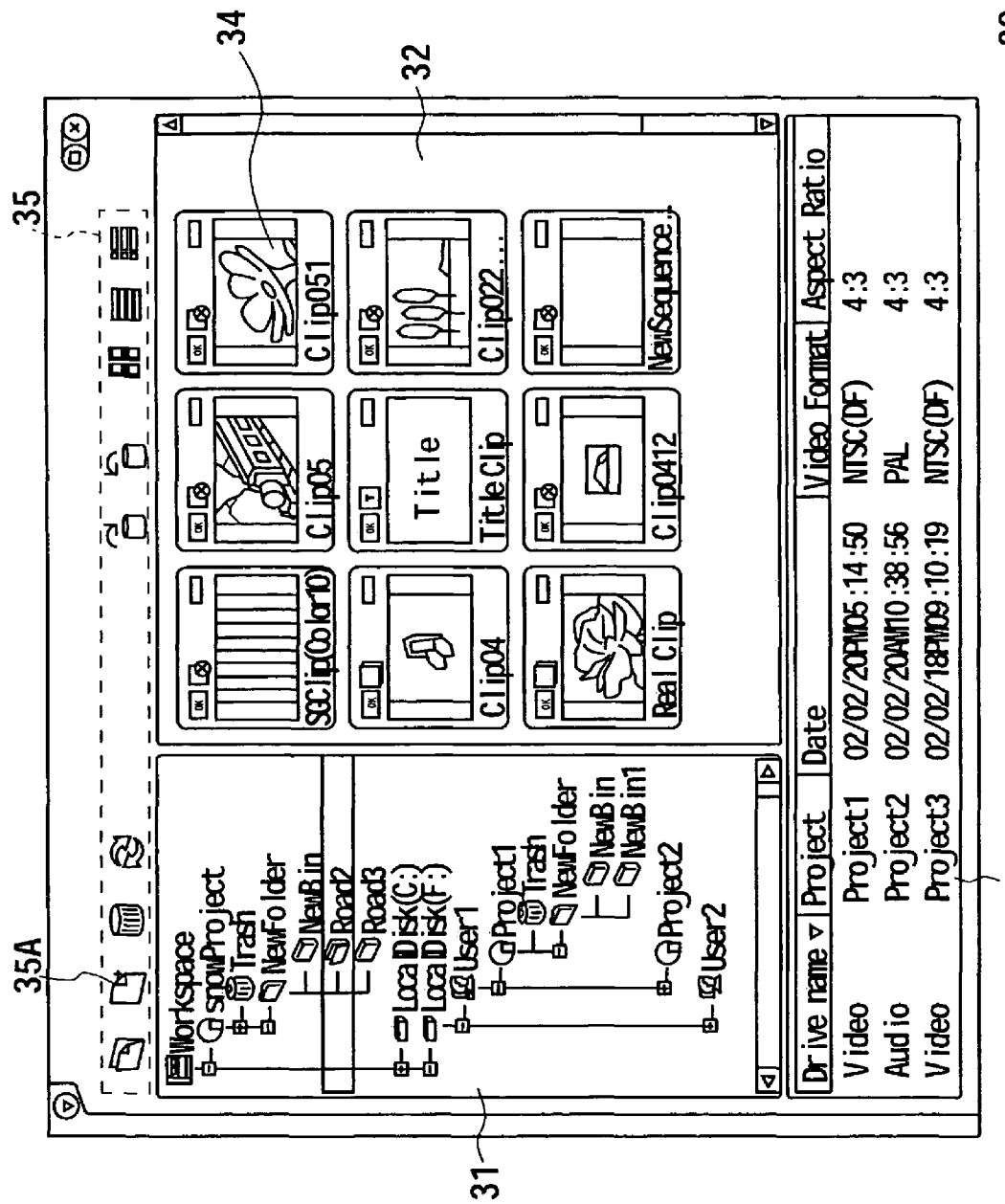
FIG. 3 is a schematic diagram showing a project manager window.

Therefore, a new project should be created when a new edit list is created. In this case, the operator starts corresponding software to display a project manger window 30 as shown in FIG. 3, on the display 13 (FIG. 1).

The project manager window 30 is a window that is used for managing and viewing projects, and is composed of a tree display part 31, a clip display part 32, and a project list display part 33.

The tree display part 31 of the project manager window 30 displays the storage positions of files of all projects (hereinafter, referred to as project files) existing in the computer 4 in a form of a tree.

The clip display part 32 displays a list of the thumbnail images of clips belonging to a project being selected in the tree display part 31, as icons (hereinafter, referred to as clip icons) 34. The clip list display part 33 lists management information such as a storage drive name, a project name and an updated date and time, for each project being displayed in the tree display part 31, with text.

Figure 4:
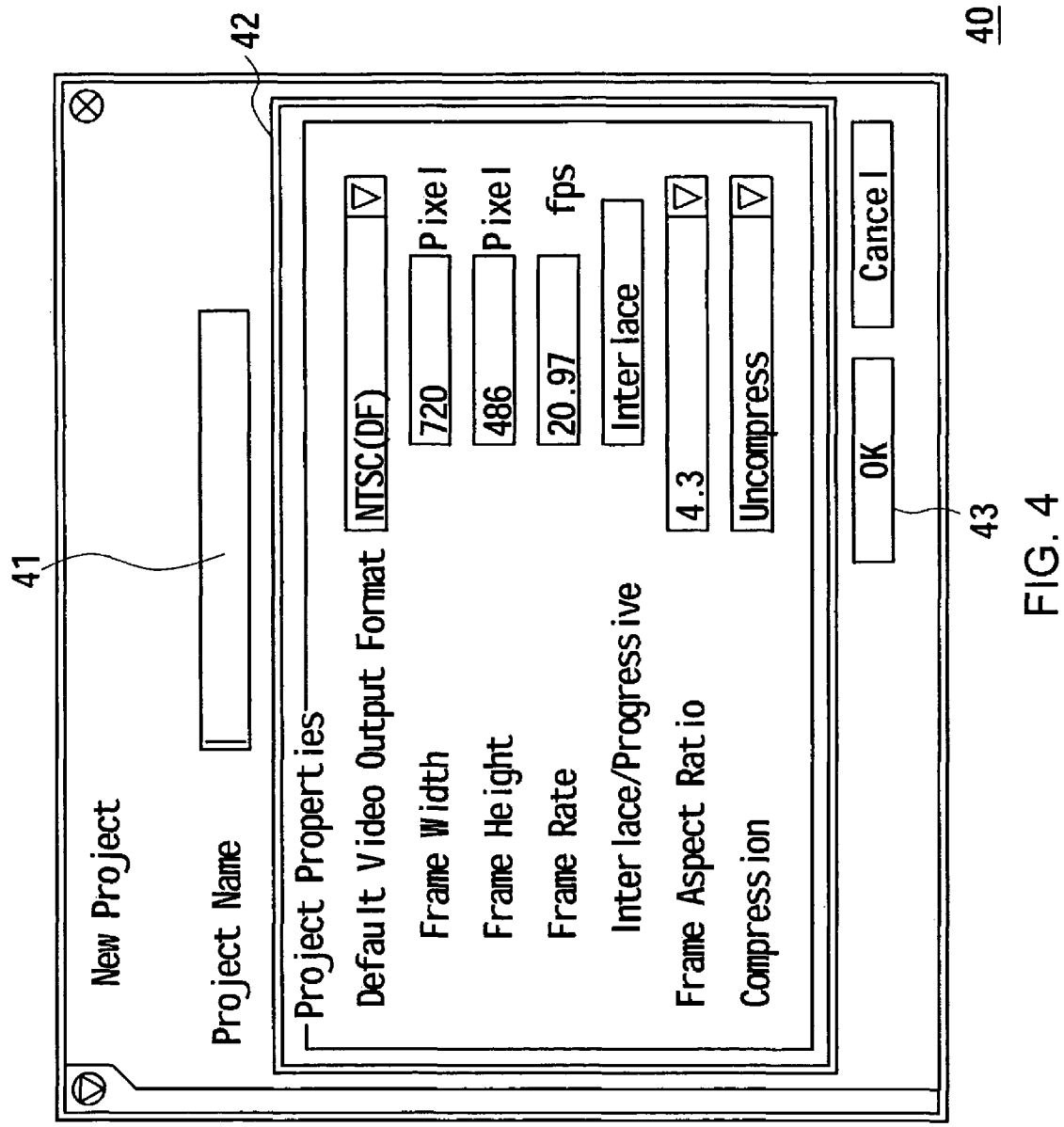
FIG. 4 is a schematic diagram showing a new project dialog.

In a case of creating a new project, the operator clicks a new creation button 35A of a button group 35 being displayed at an upper part of the project manager window 30, thereby displaying a new project dialog 40 shown in FIG. 4. Then the operator enters a desired project name in a project name input box 41 of this new project dialog 40, sets various attributes regarding to this project in an attribute setting part 42, and then clicks an OK button 43.

Thus this new project is newly registered and a new folder and bin are automatically created in this project. This result is reflected in the tree display part 31 and the project list display part 33 of the project manager window 30 (FIG. 3).

Figure 5:
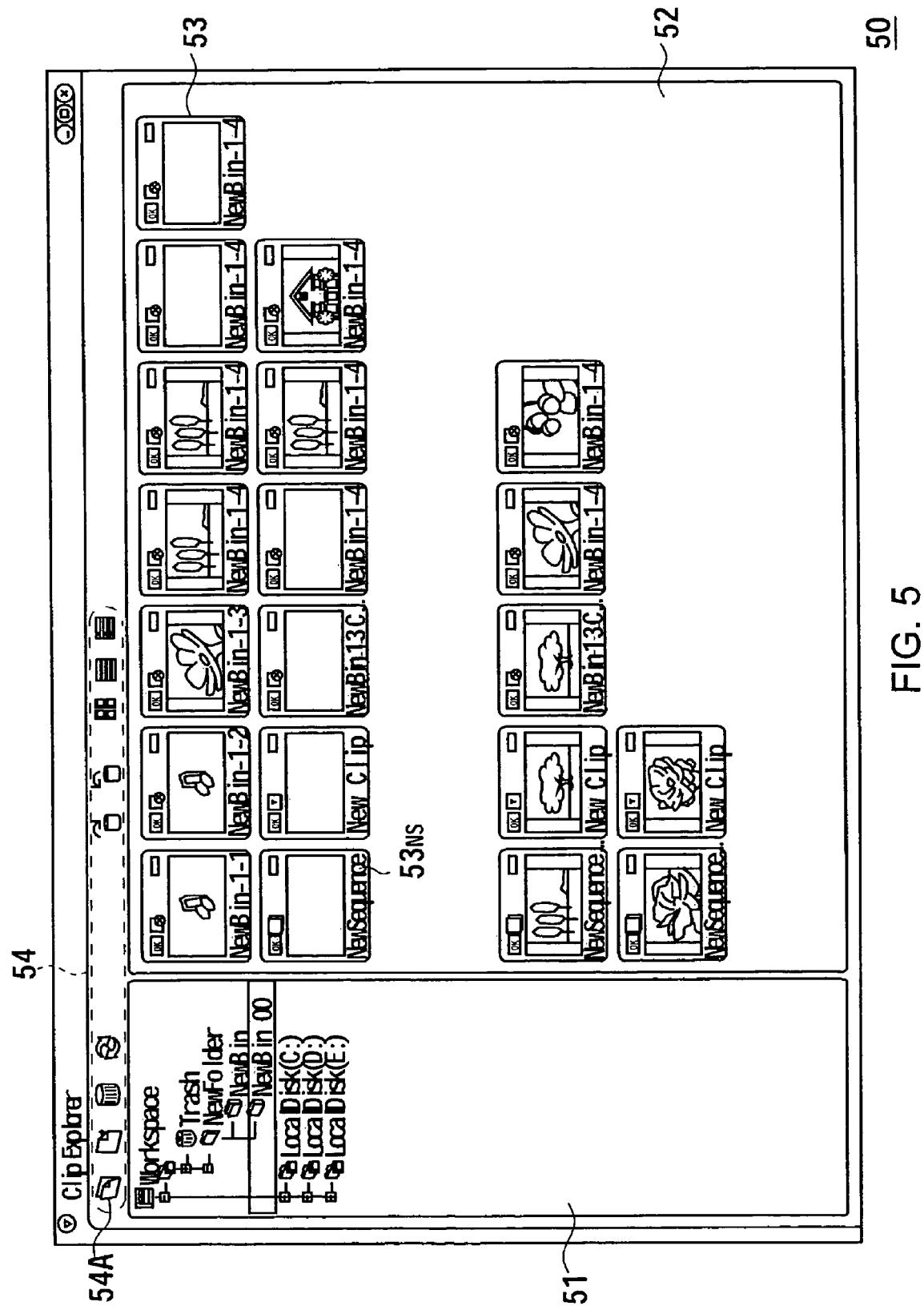
FIG. 5 is a schematic diagram showing a clip explorer window.

In addition, at this time, a clip explorer window 50 shown in FIG. 5 is displayed on the display 13 (FIG. 1) based on the clip management information database being stored in the hard disk drive 28 (FIG. 2), the database containing management information such as the time codes of IN-point and OUT-point of each clip, a material length (duration), a clip ID, a clip name, a captured date and time of the video and audio, and a created date and time of the clip.

This clip explorer window 50 is a window to display a list of clips being stored in the memory device 3, and is composed of a tree display part 51 and a clip display part 52.

The tree display part 51 of the clip explorer window 50 displays all folders and files in the memory device 3, in a form of a tree. The clip display part 52 displays clip icons 53 for all clips being stored in a folder being selected in the tree display part 51.

Figure 6:
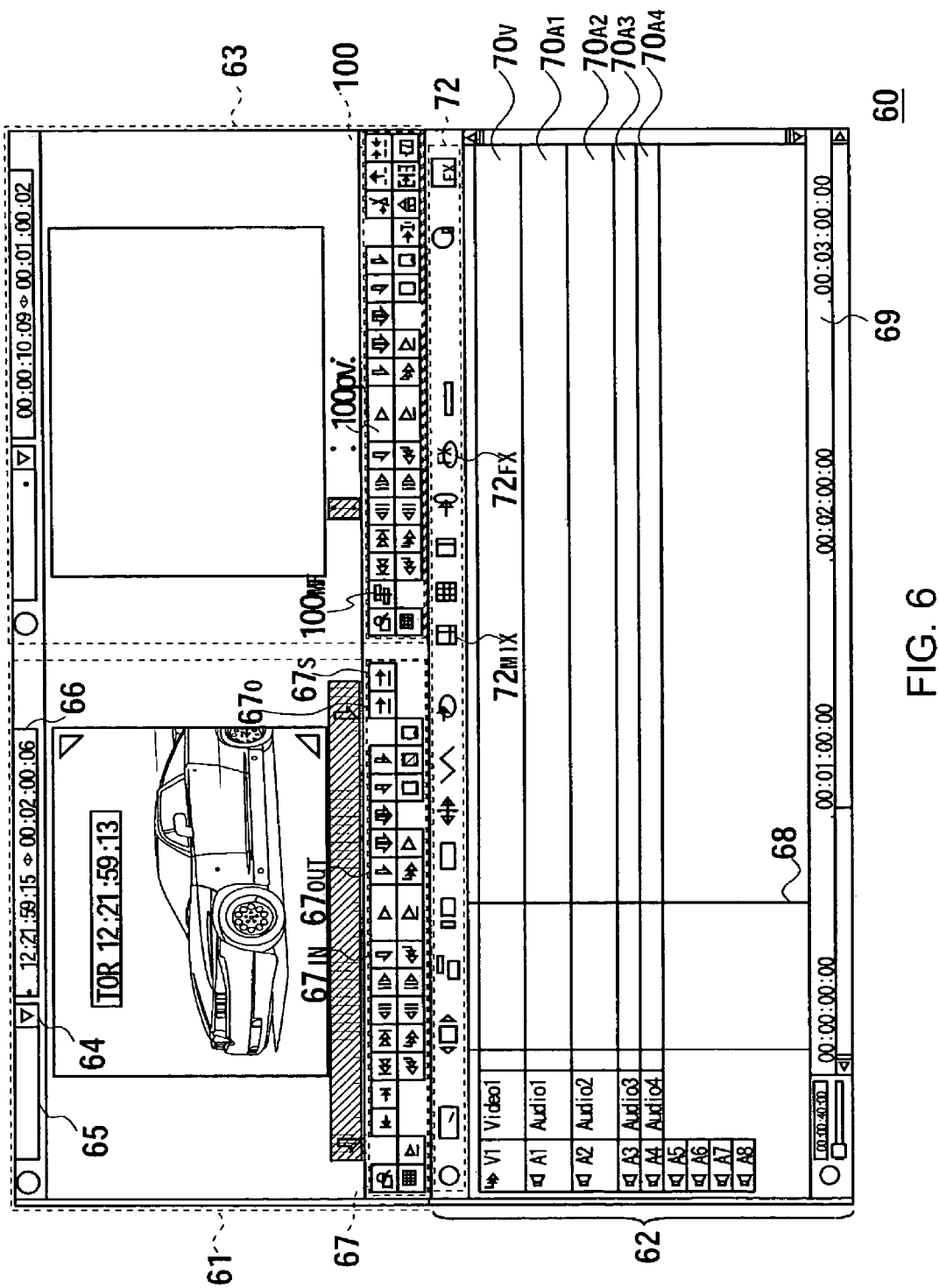
FIG. 6 is a schematic diagram showing a time line editor window.
Figure 7:
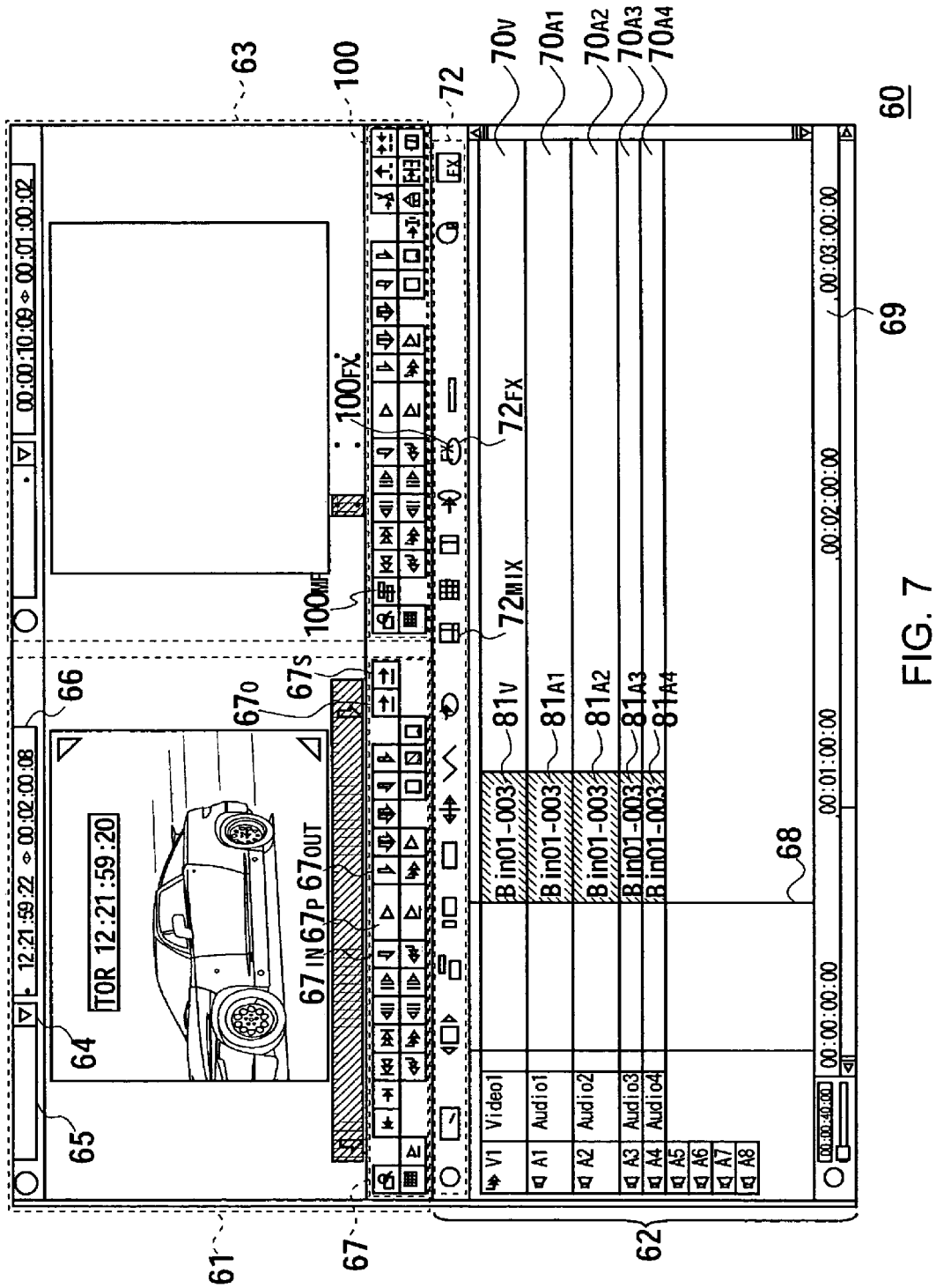
FIG. 7 is a schematic diagram showing the time line editor window.

In a case of creating a new edit list, the operator clicks a new sequence creation button 54A of a button group 54 being displayed at an upper part of the clip explorer window 50 after creating a new project as described above. As a result, a clip icon $53_{NS}$ corresponding to the edit list to be created is displayed in the clip display part 52 of the clip explorer window 50. In addition, a time line editor window 60 shown in FIG. 6 is displayed on the display 13 (FIG. 1).

The time line editor window 60 is composed of a source viewer part 61 for extracting desired parts as cuts while confirming the video of clips, a time line part 62 for setting edit details specifying how extracted cuts are arranged and what special effects are applied to the connecting parts of the cuts, and a master viewer part 63 for confirming the edit details set in the time line part 62.

The operator moves the clip icon 53 of a desired clip out of the clip icons 53 (FIG. 5) being displayed in the clip display part 52 (FIG. 5) of the clip explorer window 50 (FIG. 5), onto the source viewer part 61 of the time line editor window 60 by drag and drop, thereby selecting the clip as a clip to be used for editing. By repeating this process, a plurality of clips is selected.

In addition, on the time line editor window 60, a list of clips selected as described above can be displayed as a menu by clicking a clip select menu display button 64 being displayed at an upper part of the source viewer part 61. Then a desired clip can be selected in the menu as a clip to be edited.

At this time, a main image (for example, image of beginning frame) of a selected clip is displayed in the source viewer part 61 and the name of this clip is displayed in a clip list box 75. In addition, the time code of the frame of the clip being displayed in the source viewer part 61 and the material length of the clip are displayed in a time code display part 66.

Then on the time line editor window 60, video based on the digital video signal S6, S4 (FIG. 1) for the clip selected to be edited, which is stored in the memory device 3, is played back at a normal speed, frame by frame, or backwards frame by frame, by clicking a desired command button of a command button group 67 being displayed at a lower part of the source viewer part 61.

In actual, when a command button for normal playback, frame playback, backward frame playback is clicked out of the command button group 67, the CPU 20 (FIG. 2) of the computer 4 controls the memory device 3 via the system control unit 5 (FIG. 1) and the disk control unit 11 (FIG. 1) accordingly. Thereby the digital video signal S6, S4 for the corresponding video and audio part of the clip is read in a playback mode according to the command button 62 clicked. As a result, video based on the digital video signal S6, S4 is played back in the source viewer part 61 at a normal speed, frame by frame, or backwards frame by frame.

Thus the operator can specify a start point (IN-point) and end point (OUT-point) of a video and audio part to be used as a cut, out of the video and audio of the clip by clicking an mark-in button $67_{IN}$ and a mark-out button $67_{OUT}$ of the command button 67 while visually confirming the video of the clip being displayed in the source viewer part 61 in a state where the desired video is displayed.

In addition, the operator can create an edit list by using a video/audio part to be used as a cut of a clip of which the range has been specified as described above, under a following procedure.

First the range of a video/audio part to be used as a cut is specified out of a clip as described above. Then a play line 68 being displayed in the time line part 62 is moved to a desired position with the mouse with a time scale 69 being displayed at a lower part of the time line part 62 as an index. And then an overwrite button $67_O$ or a splice in button $67_S$ of the command button group 67 being displayed at a lower part of the source viewer part 61 is clicked.

By overwriting when the overwrite button 67O is clicked or by inserting when the splice in button $67_S$ is clicked, a bar (hereinafter, referred to as a clip bar) $71_V$ of a length corresponding to the material length of the video/audio part is displayed with its beginning positioned on the play line 68 on the video track $70_V$ of the time line part 62.

In a case where audio is accompanied with the video/audio part, clip bars $71_{A1}$ to $71_{A4}$ having the same length as the corresponding clip bar $71_V$ of the video track $70_V$ are displayed with their beginnings positioned on the play line 68, on the audio tracks $70_{A1}$ to $70_{A4}$ equal to the required number of channels out of a plurality of the audio tracks $70_{A1}$ to $70_{A4}$ under the video track $70_V$.

When it is desired that audio other than audio accompanied with the video/audio part is output when the edited video/audio is played back, just click the clip select menu display button 64 to select a previously registered clip for the audio from a list of clips being displayed, move the play line 68 of the time line part 62 to a desired position, and click the above-described overwrite button 67, or splice in button $67_S$ after specifying a desired audio track $70_{A1}$ to $70_{A4}$.

In this case, a clip bar $71_{A1}$ to $71_{A4}$ having the length corresponding to the material length of the clip is displayed with its beginning positioned on the play line 68 on the audio track $70_{A1}$ to $70_{A4}$ specified.

Figure 8:
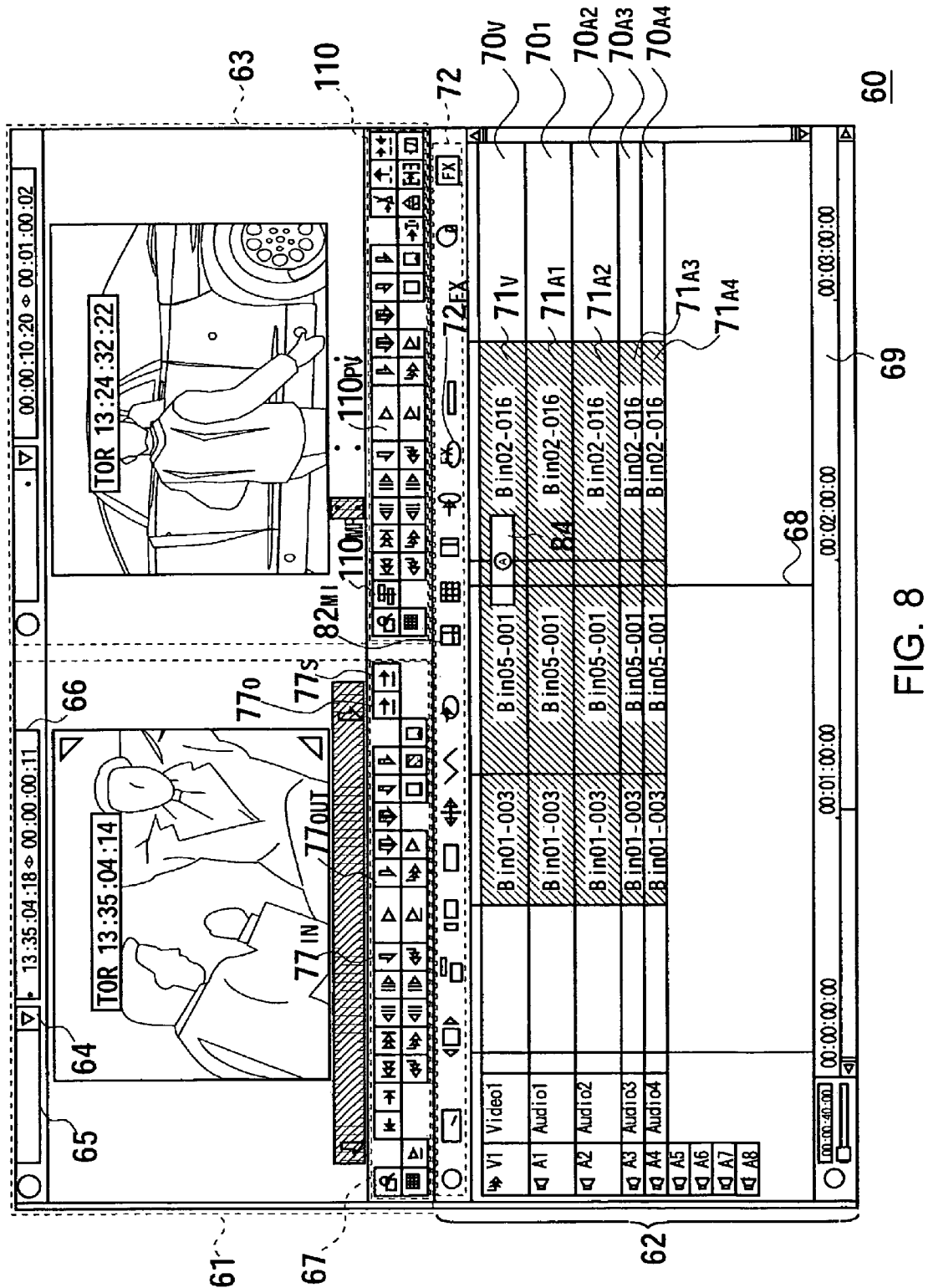
FIG. 8 is a schematic diagram showing the time line editor window.

Then the operator repeats operation including specifying a range of a video/audio part to be used as a cut as described above (determining a cut) and pasting the video/audio part to the time line part 62 (displaying clip bars $71_V$, $71_{A1}$ to $71_{A4}$ on the video track $70_V$ and/or audio tracks $70_{A1}$ to $70_{A4}$), thereby sequentially displaying the clip bars $71_V$, $71_{A1}$ to $71_{A4}$ on the video track $70_V$ and the audio tracks $70_{A1}$ to $70_{A4}$ so as to continue on the time scale 69 for a desired period of time from the beginning ("00:00.00:00") of the time scale 69 as shown in FIG. 8.

Displaying the clip bars $71_V$, $71_{A1}$ to $71_{A4}$ on the video track $70_V$ and the audio tracks $70_{A1}$ to $70_{A4}$ in the time line part 62 means that video and audio are displayed and output based on the video/audio parts corresponding to the clip bars $71_V$, $71_{A1}$ to $71_{A4}$ at time specified by the time scale 69 in the playback of edited video and audio. Therefore, an edit list specifying the order and contents of video and audio to be displayed and output as edited video and audio can be created.

In creating an edit list as described above, when the operator desires to apply a special effect to the connecting part of first cut video and second cut video, he/she can set a desired video special effect in the following manner.

Figure 9:
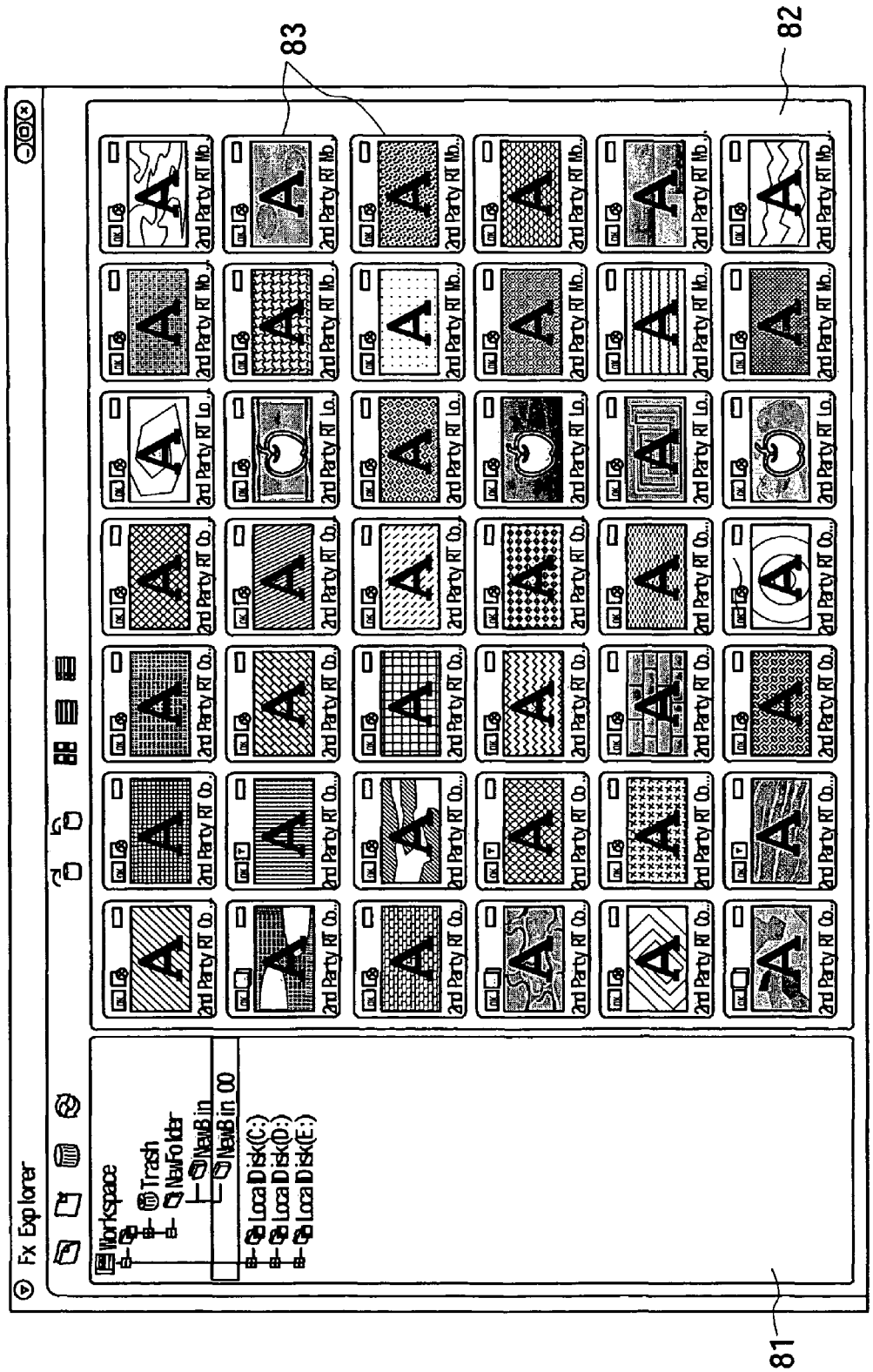
FIG. 9 is a schematic diagram showing an FX explorer window.

First the preceding first cut and the next second cut are pasted to the video track $70_V$ so as to continue on the time scale 69, and then an FX explorer button $72_{FX}$ is clicked out of the button group 72 being displayed at the upper part of the time line part 62. As a result, an FX explorer window 80 shown in FIG. 9 is displayed on the display 13 (FIG. 1).

This FX explorer window 80 is composed of a tree display part 81 and an icon display part 82. The tree display part 81 displays various kinds of video special effects which can be applied by the computer. The icon display part 82 shows the contents of these special effects, in a form of icons.

Next the operator pastes the special effect icon 83 for a desired video special effect out of the icons (hereinafter, referred to as special effect icons) 83 being displayed in the icon display part 82 of the FX explorer window 80, to the connecting part of the first and second cuts on the video track $70_V$ of the time line editor window 60 by drug and drop.

As a result, in creating edited video, setting for applying the video special effect corresponding to the special effect icon, which has been pasted to the video track $70_V$ as described above, at the switching time from the first cut video to the second cut video has been done.

In a case where a special effect icon 83 is pasted to the video track $70_V$ of the time line editor window 60, a mark 84 corresponding to the special effect icon 83 is displayed at the pasting position as shown in FIG. 8.

In addition, when the operator creates an edit list, if he/she desires to apply audio mixing to the audio of a cut or a clip pasted to an audio track $70_{A1}$ to $70_{A4}$, the desired audio mixing can be set in the following manner.

First the operator moves the play line 68 being displayed in the time line part 62 of the time line editor window 60, onto the clip bar $71_{A1}$ to $71_{A4}$ corresponding to a desired cut or clip to be subjected to the audio mixing, out of the cuts or clips pasted to the audio tracks $70_{A1}$ to $70_{A4}$, and then clicks an audio mixer button $72_{MIX}$ of the button group 72 being displayed at the upper part of the time line part 62.

Figure 10:
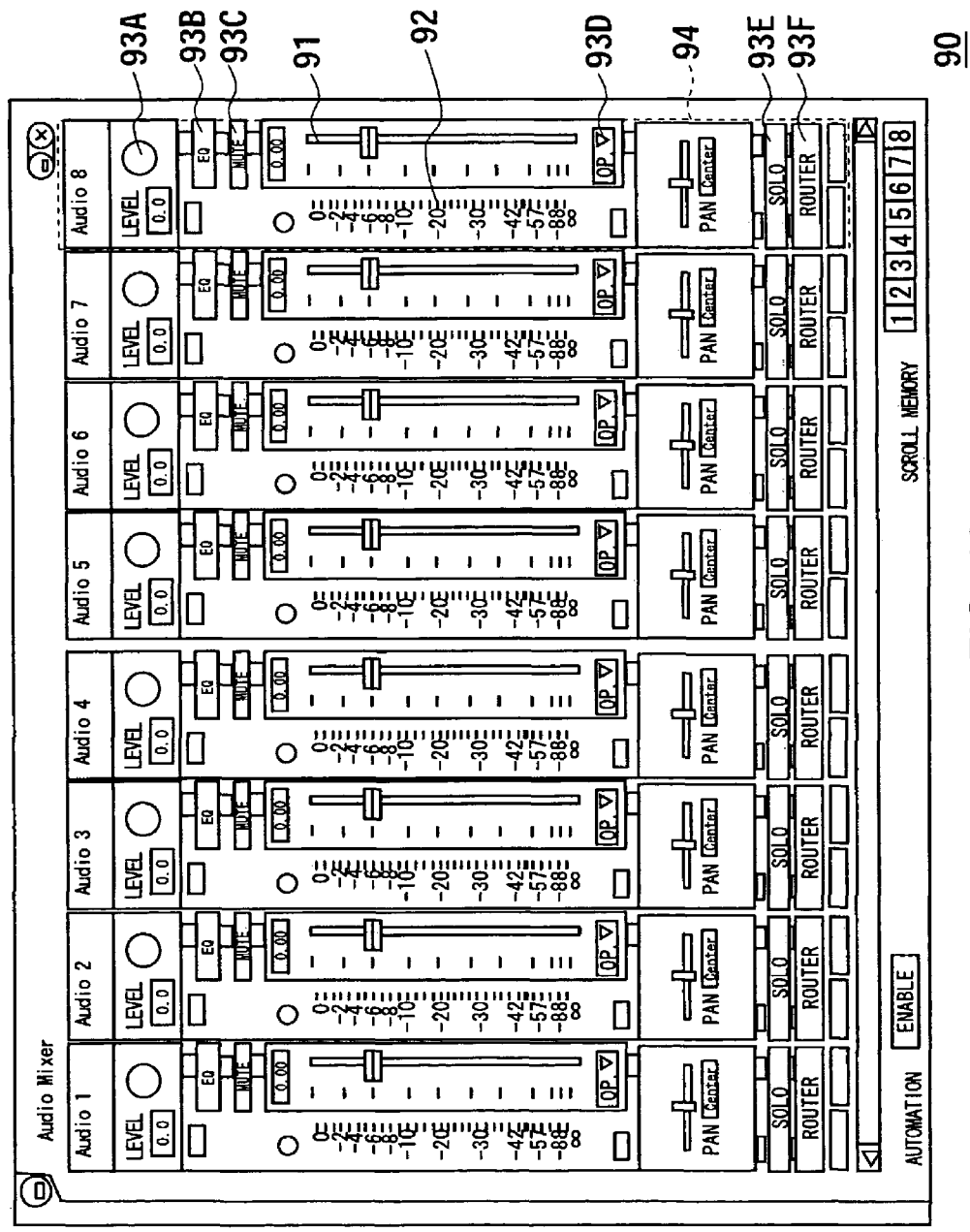
FIG. 10 is a schematic diagram showing an audio mixing window.

As a result, as shown in FIG. 10, an audio mixer window 90 is displayed in which a plurality of mixing parts 94 each having a volume 91, a level meter 92 and various setting buttons 93A to 93F are provided in correspondence with the audio tracks $70_{A1}$ to $70_{A4}$ of the time line part 62 of the time line editor window 60.

Then on the audio mixer window 90, the operator operates the volume 91 and the setting buttons 93A to 93F corresponding to a desired audio track $70_{A1}$ to $70_{A4}$ of the time line part 62 of the time line editor window 60 while visually confirming the level meter 92.

Thereby, for outputting edited audio, such setting has been done that the audio mixing should be applied, based on the details set as described above, to the audio data at a time of playback of the vide/audio part pasted to the audio track $70_{A1}$ to $70_{A4}$.

Further, with the time line editor window 60, by moving the play line 68 of the time line part 62 to a desired position with the mouse after or while creating the edit list as described above, and clicking a preview button $100_{PV}$ of a command button group 100 being displayed at the lower part of the master viewer part 63, the high-resolution edited video can be played back in the master viewer part 63 at a normal speed with the video/audio part corresponding to the play line 68 as a start point.

In actual, when the preview button $100_{PV}$ is clicked, the CPU 20 controls the memory device 3 via the system control unit 5 and the disk control unit 11 so as to read the digital video signal S6, S4 (FIG. 1) and the digital audio signal S7, S5 (FIG. 1) for the corresponding video/audio part of the corresponding clip being stored in the memory device 3 and send them to the video special effect processing unit 9 (FIG. 1) or the audio input/output/mixer unit 10 (FIG. 1) as the reproduced digital video signal S8 (FIG. 1) and the reproduced digital audio signal S9 (FIG. 1).

In addition, the CPU 20 controls the video special effect processing unit 9 and the audio input/output/mixer unit 10 via the system control unit 5 so as to perform, according to necessity, the video special effect process and audio mixing process on the reproduced digital video signal S8 and the reproduced digital audio signal S9.

As a result, the digital edited video signal S11 (FIG. 1) and edited audio signal S12 (FIG. 1) obtained through the video special effect process and the audio mixing process are given to the data processing unit 23 (FIG. 2), thereby displaying edited video based on the digital edited video signal S11 in the master viewer part 63 of the time line editor window 60 and outputting edited audio based on the edited audio signal S12 from the loudspeaker 17 (FIG. 1).

Therefore, the operator can create an edit list while occasionally viewing and confirming edit details based on the edited video being displayed in the master viewer part 63 of the time line editor window 60 or can confirm the contents of the created edit list.

After creating the edit list as described above, the operator can store the edited video and audio based on the edit list in the memory device 3 or record them on a videotape by prescribed operation.

In actual, the CPU 20 controls the memory device 3 via the system control unit 5 and the disk control unit 11 so as to read the digital video signal S6, S4 (FIG. 1) and the digital audio signal S7, S5 (FIG. 1) of the corresponding clip being stored in the memory device 3 and send them to the video special effect processing unit 9 (FIG. 1) and the audio input/output/mixer unit 10 (FIG. 1) as the reproduced digital video signal S8 (FIG. 1) and the reproduced digital audio signal S9 (FIG. 1).

In addition, the CPU 20 controls the video special effect processing unit 9 and the audio input/output/mixer unit 10 via the system control unit 5 so as to perform, according to necessity, the video special effect process and the audio mixing process on the reproduced digital video signal S8 and the reproduced digital audio signal S9 and send thus obtained digital edited video signal S11 and edited audio signal S12 to the disk control unit 11, the video output unit 7, the videotape recorder 15A to 15D or the digital video/audio input/output unit 8. As a result, the digital edited video signal S11 and the edited audio signal S12 are stored in the memory device 3 or recorded on a videotape.

As described above, with the computer, the operator can create a desired edit list by using the time line editor window 70 and further, create edited video and audio based on the edit list according to operator operation, and store them in the memory device 3 or record them on a videotape.

(4) Various Functions Regarding Group Clip

In addition to the above normal editing function, this editing apparatus 2 has functions to create a group clip with a plurality of clip as one group, add or delete a clip to/from thus created group clip, and set effects for each clip of the group clip. These will be hereinafter described.

(4-1) Creation of Group Clip

When creating a group clip, the operator displays the clip explorer window 50 (FIG. 5) on the display 13 and selects clip icons 53 corresponding to desired clips from the clip icons 53 being displayed in the clip display part 52 of the clip explorer window 50.

Figure 11:
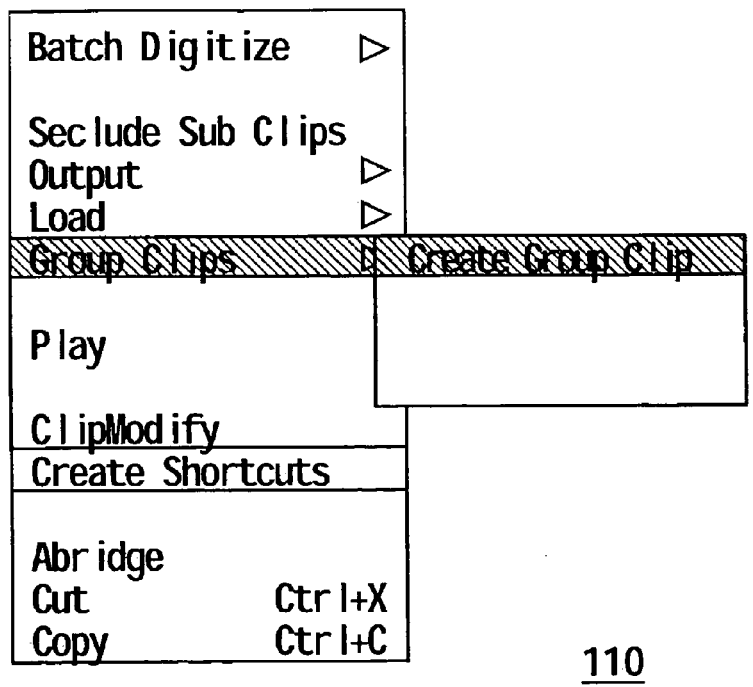
FIG. 11 is a schematic diagram showing a context menu.
Figure 12:
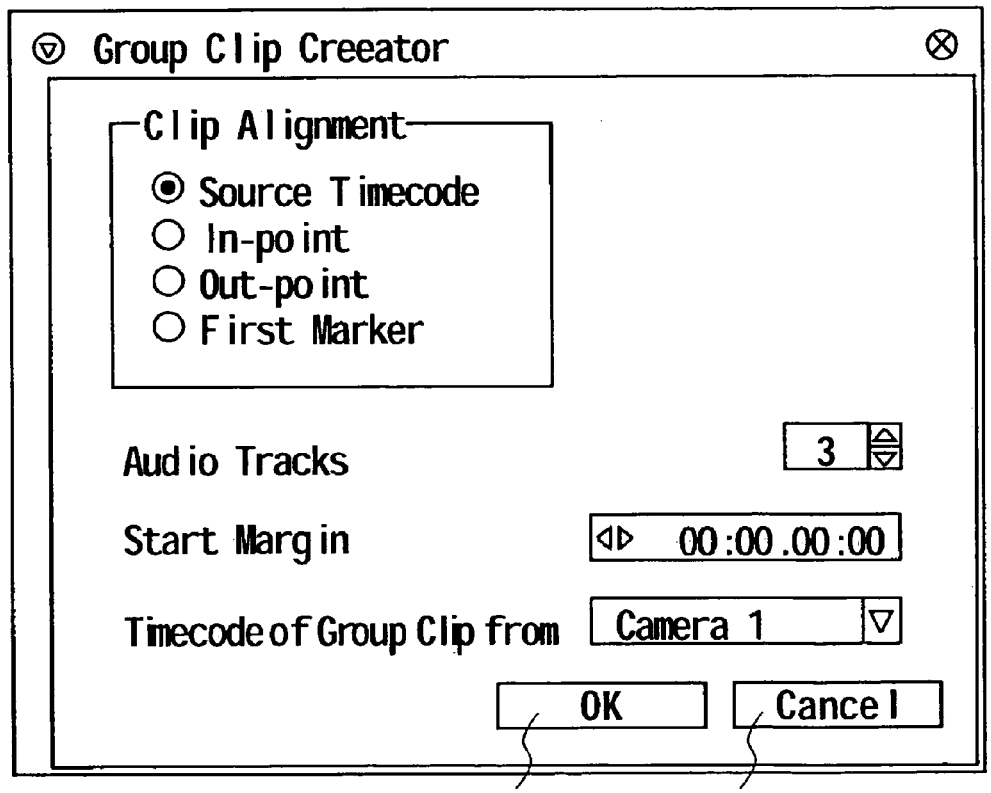
FIG. 12 is a schematic diagram showing a group clip creator dialog.

Then the operator selects "Group Clip" and "Create Group Clip" in order from a context menu 110 as shown in FIG. 11 which is displayed by clicking the right button of the mouse 14. As a result, a group clip creator dialog 111, as shown in FIG. 12, is displayed on the display 13.

This group clip creator dialog 111 is a dialog to set various necessary information for creating a group clip and allow four matters to be set: "Clip Alignment", "Audio Tracks", "Start Margin" and "Timecode of Group Clip from".

Out of these, "Clip Alignment" is used to set what is used as a basis to display clip bars $125_V$, $125_{A1}$ to $125_{A3}$ (FIG. 16) of each clip being selected in the clip display part 52 of the clip explorer window 50 (FIG. 5), in the group clip time line part 112 (FIG. 16) of the group clip time line window 120 (F9g. 16) as described later. The choices are "Source Timecode", "In-point", "Out-point", and "First Marker". These choices will be described later.

"Audio Tracks" is used to set the number of audio tracks $124_{A1}$ to $124_{A3}$ (FIG. 16) which are provided in the group clip time line part 122 when the clip bars $125_V$, $125_{A1}$ to $125_{A3}$ (FIG. 16) of each clip being selected in the clip display part 52 of the clip explorer window 50 are displayed in the group clip time line part 122 (FIG. 16) of the group time line window 120 (FIG. 16) as described later.

"Start Margin" is used to set a duration of time which is added between the beginning and the first clip of the group clip. This duration of time can be set on a frame basis.

"Timecode of Group Clip from" is used to set a time code for the entire group clip. By specifying a clip composing a group clip from a pull-down menu, the time code of the clip can be set as the time code of the group clip.

Then the operator performs these setting on the group clip creator dialog 111, and clicks an OK button 112 out of the OK button 112 and a cancel button 113 being displayed at a lower part of the group clip dialog 111, so that a group clip subjected to the setting can be created.

Figure 13:
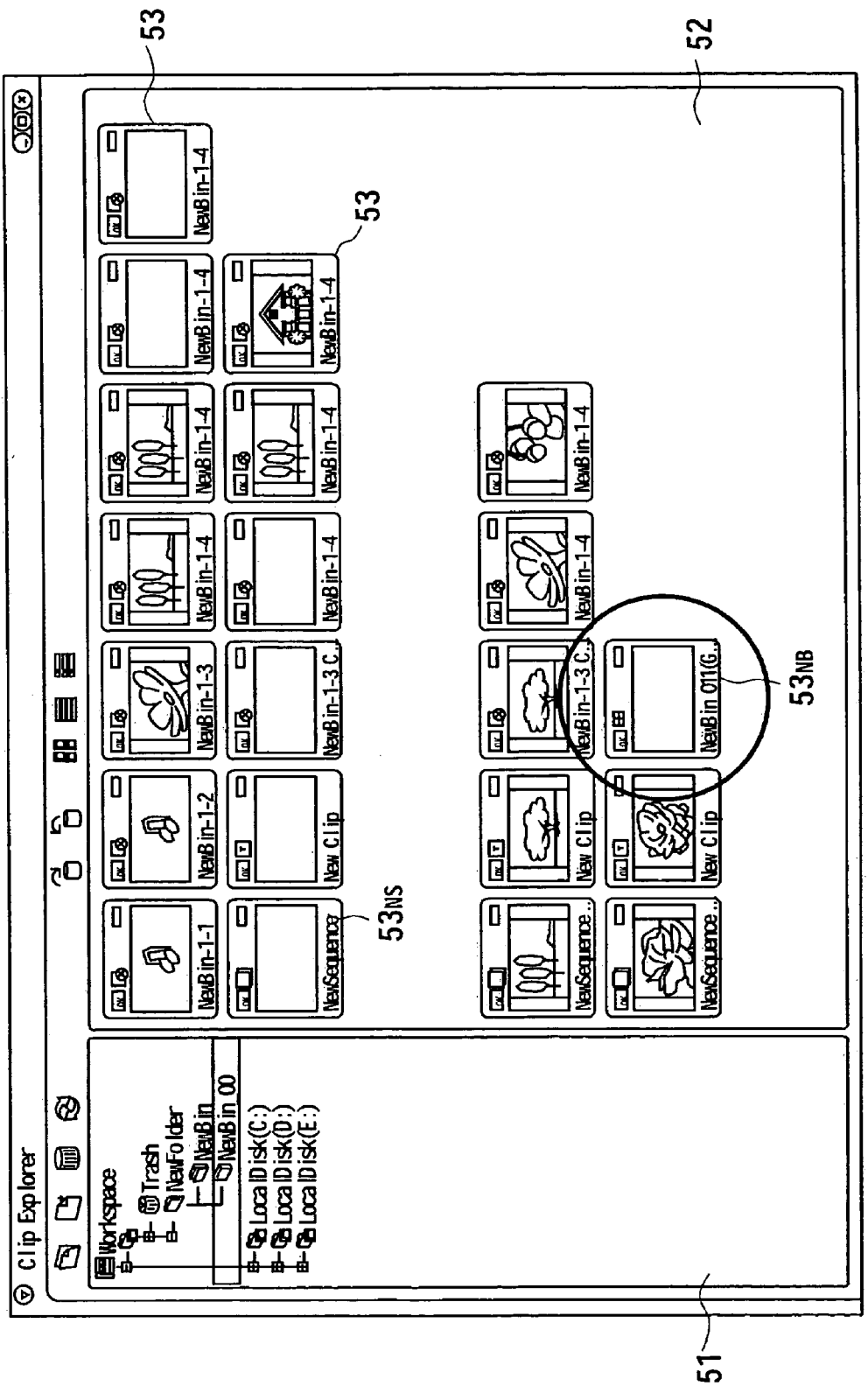
FIG. 13 is a schematic diagram explaining clip icons of a group clip.

In response to the clicking of the OK button 112, the group clip creator dialog 111 disappears from the display 13. In addition, as shown in FIG. 13, a clip icon $53_{NB}$ corresponding to the group clip is displayed in the clip display part 52 of the clip explorer window 50.

Figure 14:
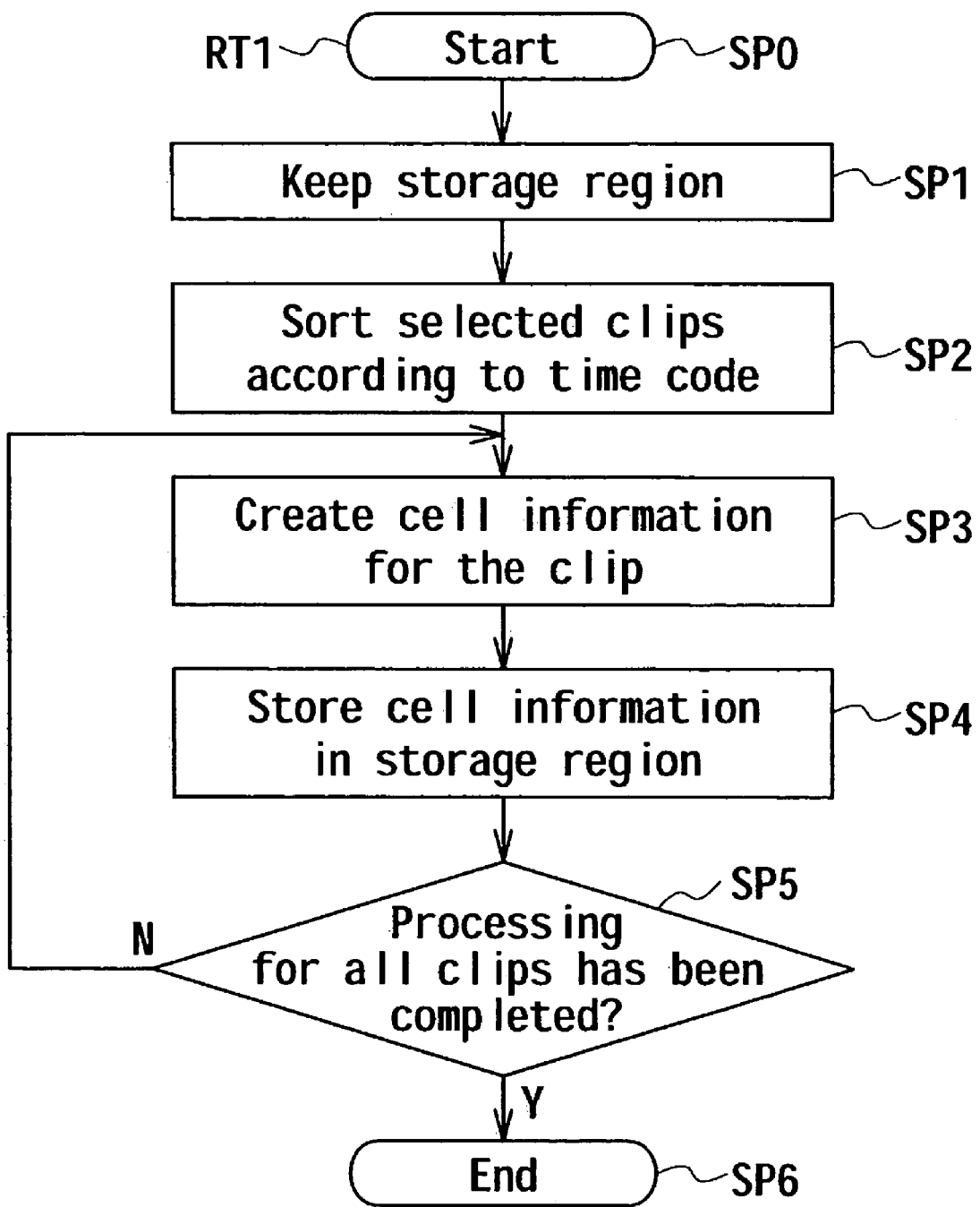
FIG. 14 is a flowchart showing a group clip creation procedure.

Note that FIG. 14 shows a specific processing procedure of the CPU 20 (FIG. 2) in creating such a group clip.

When the OK button 112 on the group clip creator dialog 111 is clicked, the CPU 20 starts this group clip creation procedure RT1 from step SP0. At step SP1, the CPU 20 keeps a memory region for storing management information to be used for managing the group clip, in the clip management information database being stored in the hard disk drive 28 (FIG. 2).

Then the CPU 20 goes on to step SP2 to sort clips being selected in the clip explorer window 50 (FIG. 5) in the order corresponding to time code.

Then the CPU 20 goes on to step SP3 to extract prescribed information such as clip ID and time code information, and information on video special effects and audio mixing, out of the management information of the clip being registered in the clip management information database, for the first clip, create cell information of the clip. Then the CPU 20 goes on to step SP4 to store this cell information in the memory region kept at step SP1.

Then the CPU 20 goes on to step SP5 to determine whether cell information for all clips being selected by the user has been extracted and stored in the memory region. When a negative result is obtained, the CPU 20 returns back to step SP4 and repeats a loop of steps SP4-SP5-SP4 while sequentially changing a target clip.

When an affirmative result is obtained at step SP5 because the cell information for all clips has been stored in the memory region, the CPU 20 moves to step SP6 to cancel the group clip creator dialog 111 (FIG. 12) from the display 13, displays a clip icon $53_{NB}$ (FIG. 13) corresponding to the group clip in the clip display part 52 of the clip explorer window 50 (FIG. 13) and then finishes this group clip creation procedure RT1.

Note that the CPU 20 manages the plurality of clips as one group clip based on the cell information of each clip being stored in the memory region kept in the clip management information database hereinafter.

(4-2) Addition/Deletion of Clip to/from Group Clip

On the other hand, the operator can add or delete a clip to/from thus created group clip in the following manner.

Figure 15:
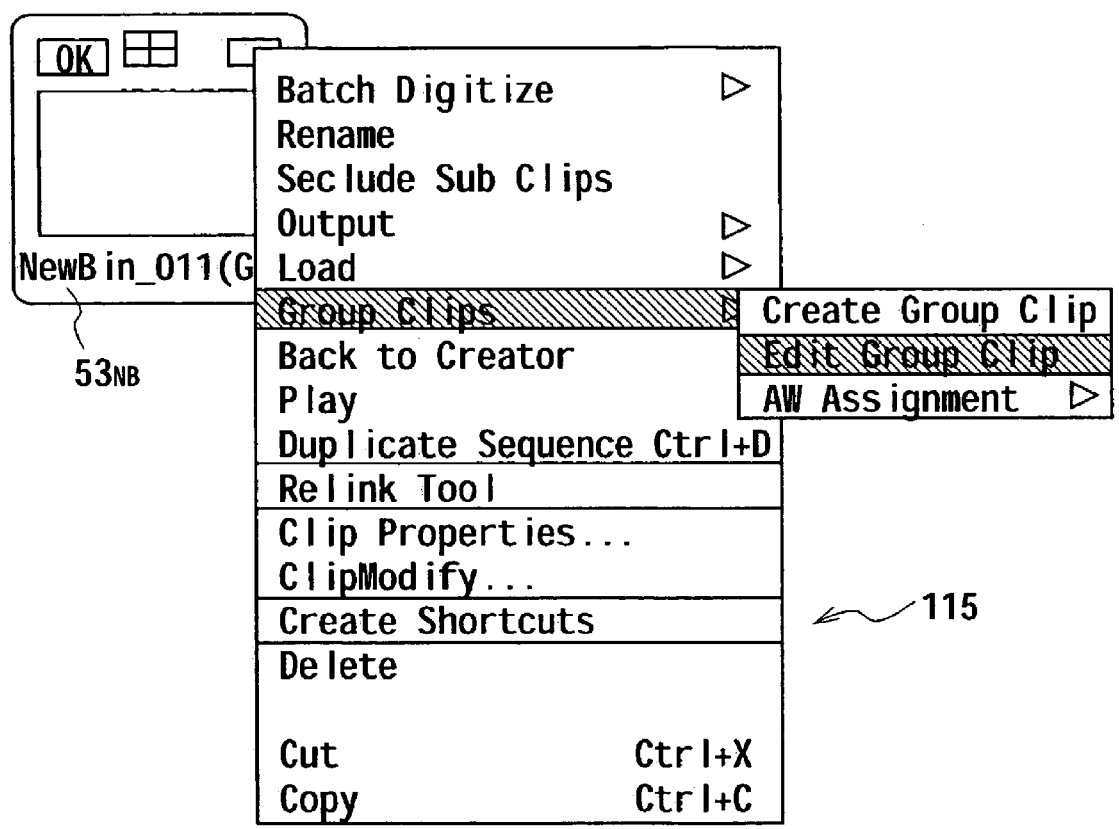
FIG. 15 is a schematic diagram showing a context menu.

Specifically, when adding/deleting a clip to/from a group clip, the operator first displays a context menu 115 as shown in FIG. 15 by clicking the right button of the mouse 14 (FIG. 1) on the clip icon $53_{NB}$ of the group clip being displayed in the clip display part 52 of the clip explorer window 50, and selects "Group Clips" and "Edit Group Clip" in order from the context menu 115. As a result, a group clip time line window 120 as shown in FIG. 16 in which the same reference numerals are applied to parts corresponding to those of FIG. 6 can be displayed on the display 13.

This group clip time line window 120 is composed of a source viewer part 121, a time line part 122, and a master viewer part 123 which have almost the same structure of the source viewer part 61, the time line part 62, and the master viewer part 63 of the time line editor window 60 described above with reference to FIG. 6.

In correspondence with clips composing the group clip, the group clip time line part 122 displays video tracks $124_V$ and audio tracks $124_{A1}$ to $124_{A3}$ equal to a number set in "Audio Tracks" of the group clip creator dialog 111 (FIG. 12), in a display manner where the video tracks $124_V$ are all arranged at an upper part.

Figure 16:
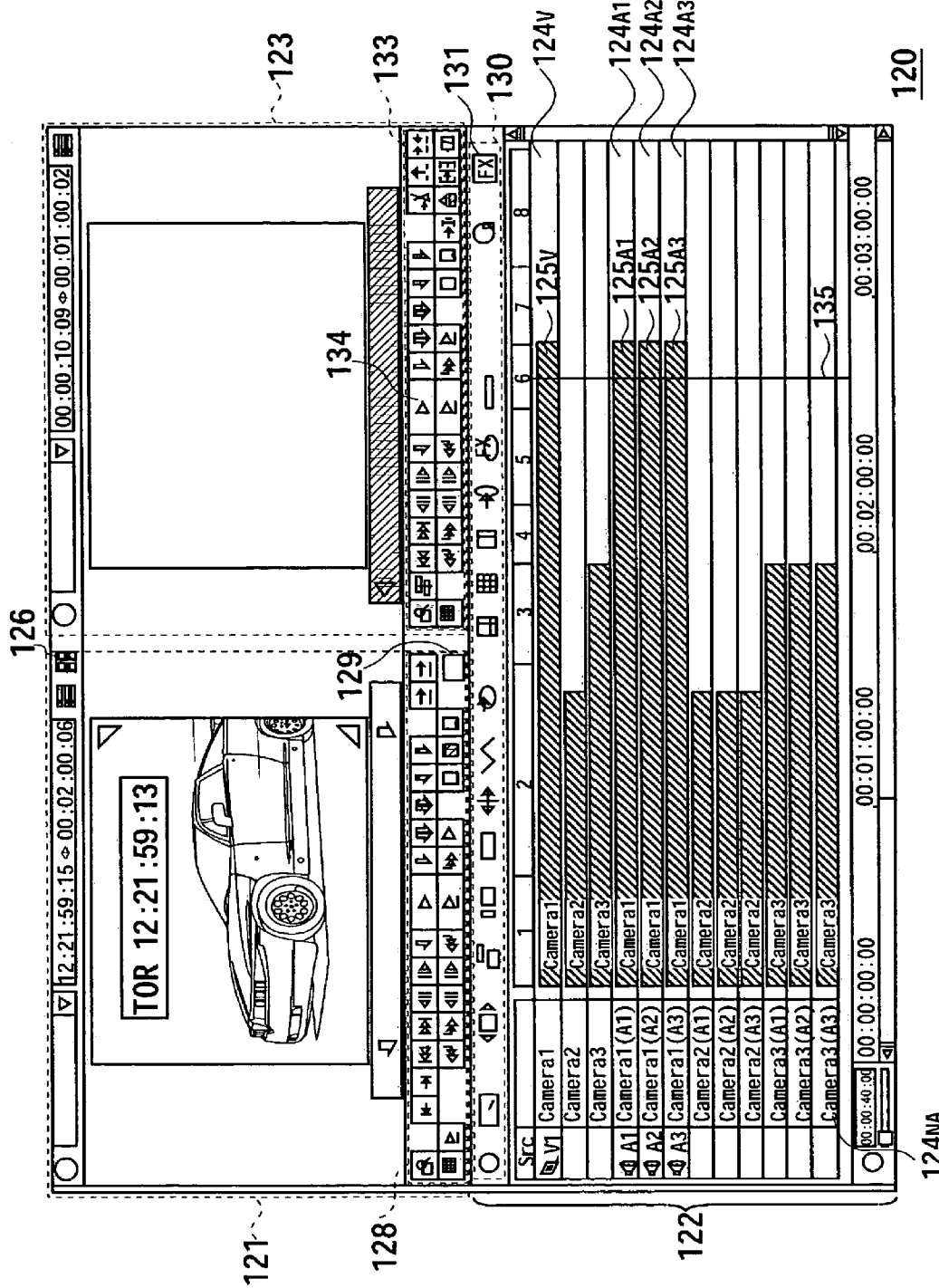
FIG. 16 is a schematic diagram showing a group clip time line window.

Therefore, even in a case where a group clip comprises three clips and these clips have audio channels of four channels (A1 to A4), two channels (A1, A2) and eight channels (A1 to A8), respectively, for example, if three channels have been set as the number of audio tracks on the group clip creator dialog 111, the audio tracks $124_{A1}$ to $124_{A3}$ for three channels (A1 to A3) are displayed for each clip as shown in FIG. 16.

In addition, on each video track $124_V$, a clip bar $125_V$ of a length corresponding to the material length of the video part of the corresponding clip is displayed. On each audio track $124_{A1}$ to $124_{A3}$, a clip bar $125_{A1}$ to $125_{A3}$ of a length corresponding to the material length of the audio channel corresponding to the corresponding clip is displayed. In the following description, displaying the clip bar $125_V$, $125_{A1}$ to $125_{A3}$ for each clip belonging to the group clip in the group clip time line part 122 of the group clip time line window 120 as described above is referred to as "put (information on) the group clip in the group clip time line part 122 of the group clip time line window 120".

In this case, the positions of displaying the clip bars $125_V$, $125_{A1}$ to $125_{A3}$ to be displayed on the video tracks $124_V$ and the audio tracks $124_{A1}$ to $124_{A3}$ are different depending on the setting of "Clip Alignment" set on the group clip creator dialog 111 described above with reference to FIG. 12.

Figure 17:
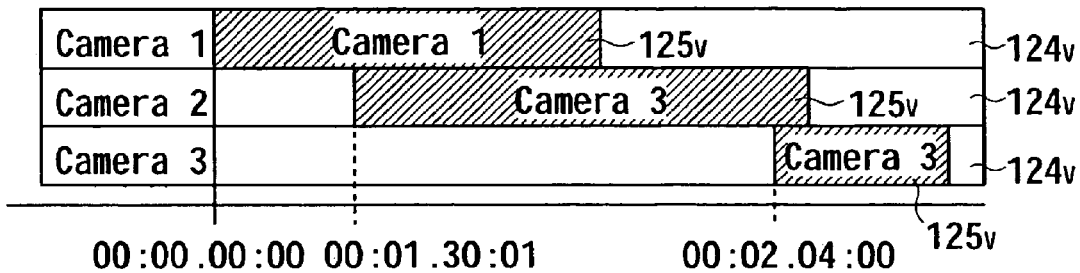
FIG. 17 is a schematic diagram explaining the display positions of clip bars at setting of a source time code.

When "Source Timecode" is selected as "Clip Alignment", for example, the clip bar $125_V$ of each clip is displayed at a position in which the own time code matches the group clip time code, on the basis of the time code (hereinafter, referred to as group clip time code) of the clip selected in "Timecode of Group Clip from) of the group clip creator dialog 111 (FIG. 12) as shown in FIG. 17.

Figure 18:
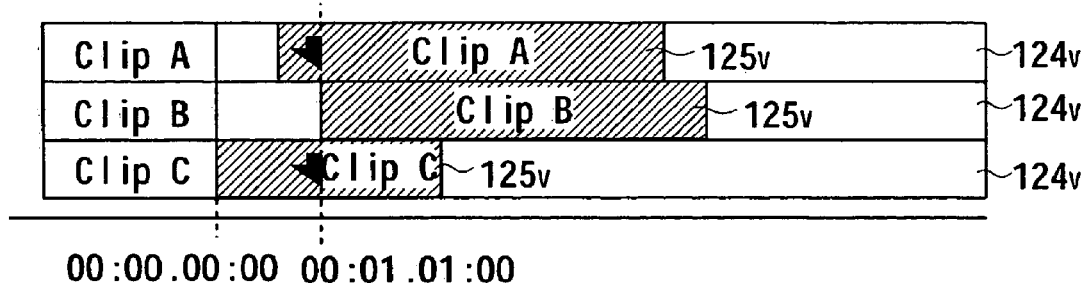
FIG. 18 is a schematic diagram explaining the display positions of the clip bars at IN-point setting.

When "In-point" is selected as "Clip Alignment", on the other hand, each clip bar 125$_V$ is displayed so that the IN-points of the other clips are arranged at the same time code of the group clip time code, on the basis of the In-point ("00: 01.01:00" in FIG. 18) set to the clip being selected in "Timecode of Group Clip from" as shown in FIG. 18. In this case, as to a clip of which the IN-point is not set, a clip bar 125$_V$ is displayed with its beginning (start point of the clip) positioned at the time code.

Figure 19:
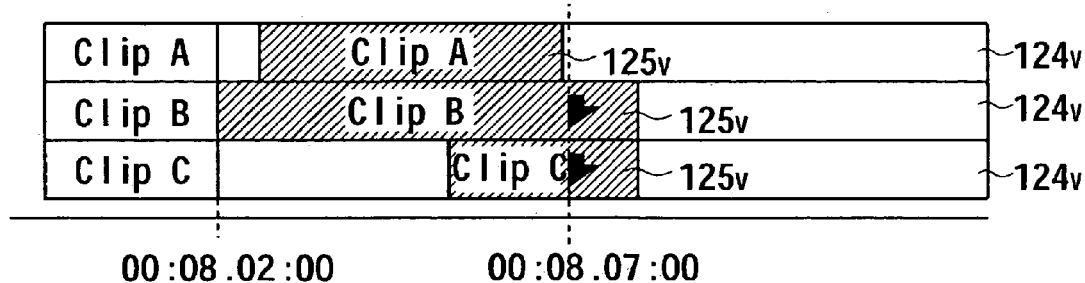
FIG. 19 is a schematic diagram explaining the display positions of the clip bars at OUT-point setting.

When "Out-point" is selected as "Clip Alignment", each clip bar 125$_V$ is displayed so that the OUT points of the other clips are arranged at the same time code of the group clip time code, on the basis of the Out-point ("00:08.07:00" in FIG. 19) set to the clip being selected in "Timecode of Group Clip from" as shown in FIG. 19. In this case, as to a clip of which the OUT-point is not set, a clip bar 125$_V$ is displayed with its last (end point of the clip) positioned at the time code.

Figure 20:
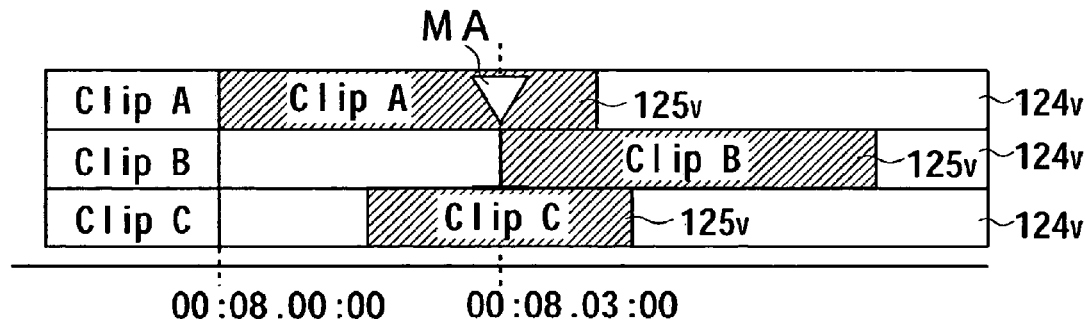
FIG. 20 is a schematic diagram explaining the display positions of the clip bars at first mark setting.

When "Fist Marker" is selected as "Clip Alignment", each clip bar 125$_V$ is displayed so that the beginning markers of the other clips are arranged at the same time code of the group clip time code, on the basis of a marker (hereinafter, referred to as beginning marker) closest to the beginning of the clip set to the clip selected in "Timecode of Group Clip from" as shown in FIG. 20. In this case, as to a clip of which the marker is not set, the IN-point is used instead of the beginning marker, and further, as to a clip of which the IN-point is not set, the beginning of the clip bar 125$_V$ is used instead.

In addition, at this time, the source viewer part 121 displays a main image (for example, image of beginning frame) of a clip selected first out of the clips composing the group clip. In this case, by clicking a display switching button 126 of the source viewer part 121 on the group clip time line window 120, the main images of the clips included in the group clip can be displayed in a four-split-screen display mode or a nine-split-screen display mode.

Figure 21:
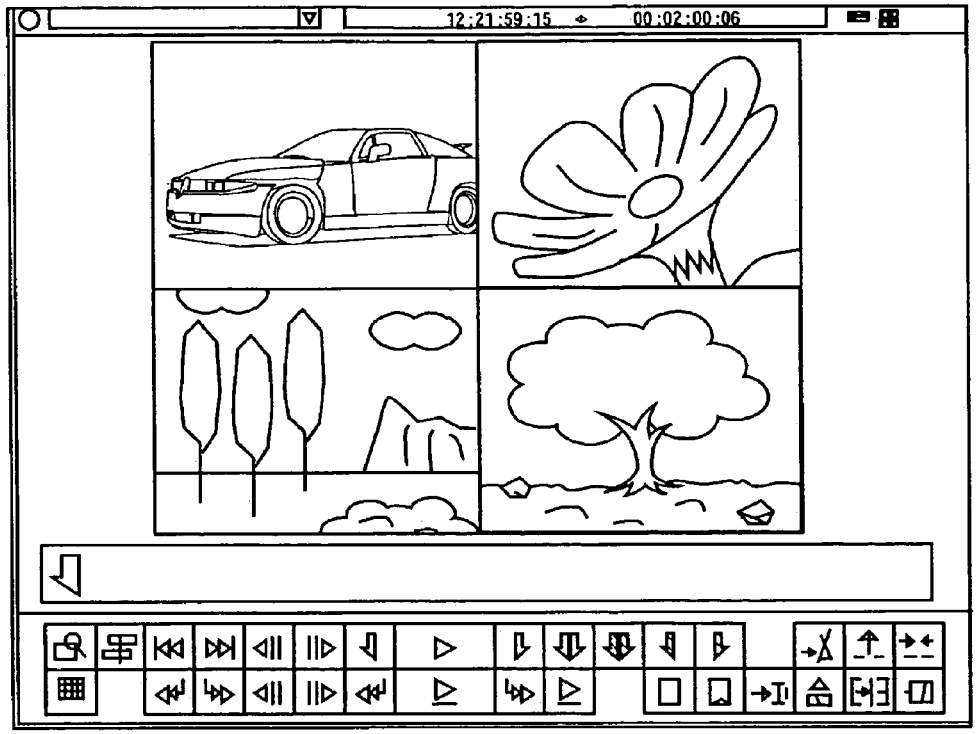
FIG. 21 is a schematic diagram showing a floating viewer window.
Figure 22:
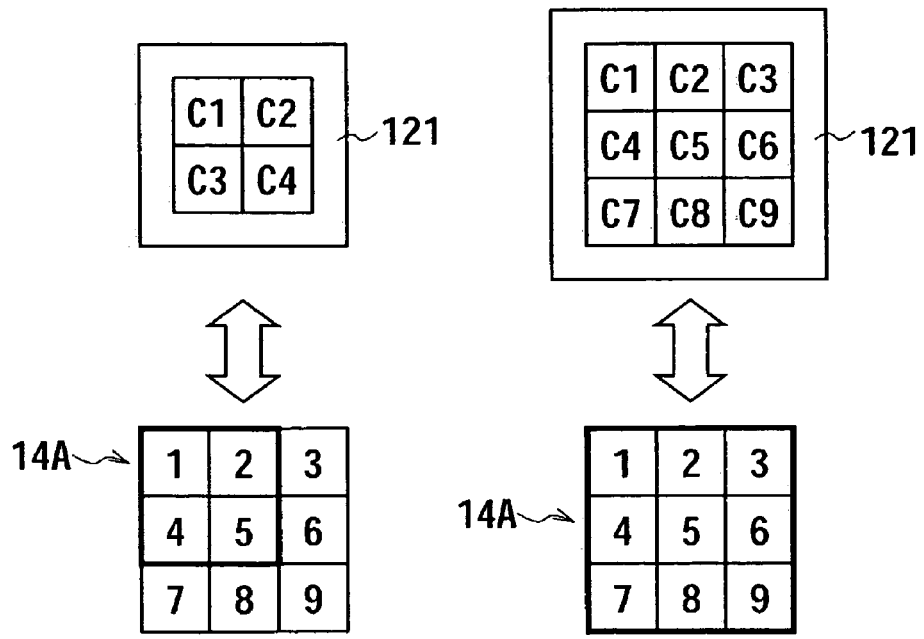
FIG. 22 is conceptual view explaining how to switch images being displayed in a master viewer part in a multi-camera mode.

In addition, on the group clip time line window 120, by selecting "Separate Source Viewer" from the context menu (not shown) which is displayed by right clicking on the source viewer part 121, a floating viewer window 127 as shown in FIG. 21 can be displayed on the display 13 differently from the group clip time line window 120.

This floating viewer window 127 has almost the same structure as the source viewer part 121 of the group clip time line window 120, and the same images as the images displayed in the source viewer part 121 are displayed on this floating viewer window 127.

In this case, on this floating viewer window 127, a display position and size are changeable. Therefore, if the main image of each clip being displayed in the four or nine-split-screen display mode in the source viewer part 121 of the group clip time line window 120 is small and is hard to see, this floating viewer window 127 is displayed, thereby improving the visibility of the main image of the clip.

In addition, on the group clip time line window 120, by clicking a playback button 134 of the command group 133 being displayed at a lower part of the master viewer part 123 after putting a group clip in the group clip time line part 122, video of the one clip being selected can be displayed in the master viewer part 123 from a point corresponding to the time line of the play line 135 being displayed in the group clip time part 122.

Figure 23:
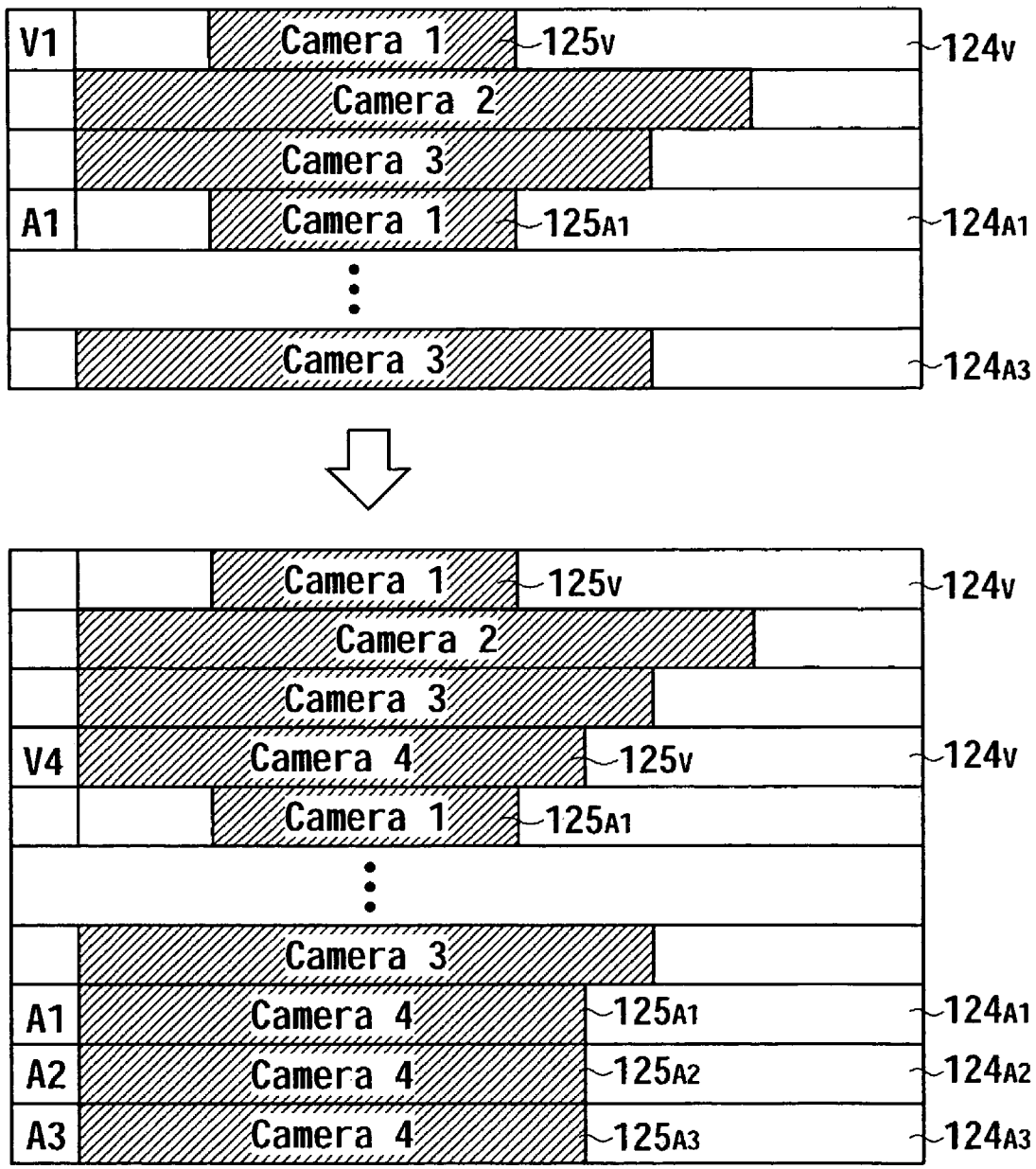
FIG. 23 is a schematic diagram explaining the addition of a clip to a group clip.

In addition, on the group clip time line window 120, in a case where the operation mode to display an image of a clip in the source viewer part 121 is a display mode (multi-camera mode) to display the main images of clips in the four or nine-split-screen display mode as shown in FIG. 23, the video to be displayed in the master viewer part 123 can be switched to the video of the clip corresponding to a main image by pressing a key out of the numeric keypad (such as ten keys) 16A locating at a position corresponding to the display position of the main image in a case where a main image locating at an upper-left part of the source viewer part 121 corresponds to "1" of the numeric keypad 16A of the keyboard 16 (FIG. 1).

For example, in a case where the main images of clips are displayed in the four-split-screen display mode in the source viewer part 121, key "1" of the numeric keypad 16A may be pressed to display the video of the clip C1 in the master viewer part 123, and by pressing numeral key "2", "4", or "5" of the numeric keypad 16A in this situation, this video being displayed in the master viewer part 123 can be switched to the video of the clip C2, clip C3, or clip C4.

On the other hand, in a case where the images of clip are displayed in the nine-split-screen display mode in the source viewer part 121, a key "1" of the numeric keypad 16A may be pressed to display the video of the clip C1 in the master viewer part 123, and by pressing numeral key "2" to "9" of the numeric keypad 16A in this situation, the video being displayed in the master viewer part 123 can be switched to the video of the clip C2 to C9.

As described above, with this editing apparatus 2, video being displayed in the mater viewer part 123 can be switched with good operability.

When the operator adds a new clip to a group clip, he/she puts the group clip in the group clip time line part 122 of the group clip time line window 120 as described above, and then selects a clip icon 53 of a desired clip out of the clip icons 53 being displayed in the clip display part 52 of the clip explorer window 50 (FIG. 5).

Then the operator moves this clip icon 53 onto the source viewer part 121 of the group clip time line window 120 by drug and drop, and clicks an addition button 129 of the switch group 128 being provided at a lower part of the source viewer part 121.

As a result, as shown in FIG. 23, in correspondence with the clip, a video track 124$_V$ and audio tracks 124$_{A1}$ to 124$_{A3}$ equal to a number, which was set on the group clip creator dialog 111 (FIG. 12), are additionally displayed in the group clip time line part 122 of the group clip time line window 120.

Then a clip bar 125$_V$ of a length corresponding to the material length of the video part of the clip is displayed on the additionally displayed video track 124$_V$, and clip bars 125$_{A1}$ to 125$_{A3}$ of lengths corresponding to the audio channels of the clip are displayed in the additionally displayed audio racks 124$_{A1}$ to 124$_{A3}$. The clip bars 125$_V$ and 125$_{A1}$ to 125$_{A3}$ of the video track 124$_V$ and the audio tracks 124$_{A1}$ to 124$_{A3}$ are positioned according to the setting contents of the "Clip Alignment" set on the group clip creator dialog 111 (FIG. 12).

Figure 24:
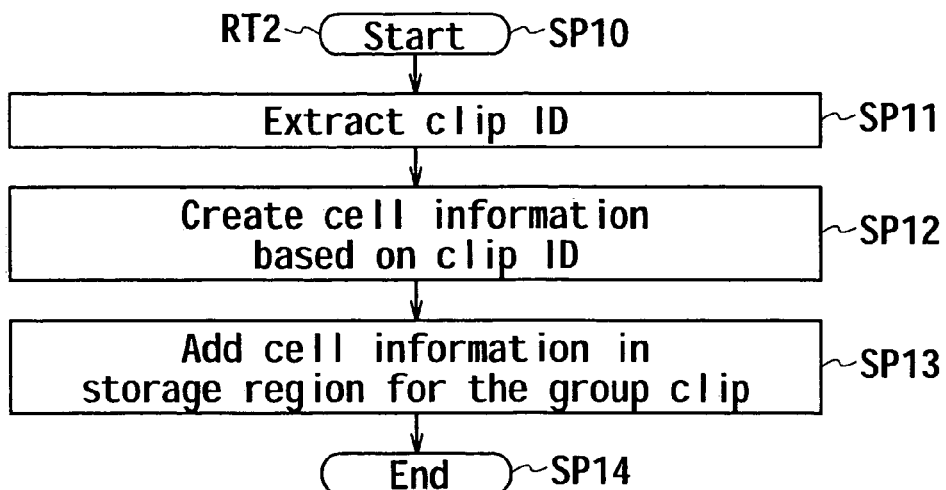
FIG. 24 is a flowchart showing a clip addition procedure.

At this time, the CPU 20 executes an internal process to add the clip to the group clip with the clip addition procedure RT2 shown in FIG. 24.

That is, when the clip icon 53 being displayed on the click clip explorer window 50 (FIG. 5) is moved onto the source viewer part 121 of the group clip time line window 120 by drug and drop and the addition button 129 in the source viewer part 121 is clicked, the CPU 20 starts this clip addition procedure RT2 from step SP10, and at step SP11 it obtains the clip ID of the clip.

Sequentially, the CPU 20 moves on to step SP12 to read clip information on the clip by searching the above-described clip management information database being stored in the hard disk drive 28 (FIG. 2), based on the clip ID, extract only necessary information from the clip information, such as the clip name, the time codes of the IN-point and OUT-point, and an effect list indicating video special effects and audio mixing for the clip, if set, and then create cell information for the clip.

Then the CPU 20 moves on to step SP13 to additionally store this cell information in the storage region of the clip information management database, the storage region storing the clip information of the group clip (information such as the created date and time of the group clip, the clip ID of the group clip, and the clip name, including the cell information of each clip). As a result, the clip has been added to the group clip in the editing apparatus 2. Then the CPU 20 moves on to step SP14 where this clip addition procedure RT2 is completed.

In a case of deleting a desired clip from the group clip, the operator puts the group clip in the group clip time line part 22 of the group clip time line window 120 (FIG. 16) as described above, and then selects one of the video track $124_V$ and audio tracks $124_{A1}$ to $124_{A3}$ of the clip being displayed in the group clip time line part 122 with the mouse.

Then the operator displays the context menu (not shown) by the right click while selecting this clip, and then selects "Delete" from the context menu.

As a result, the video track $124_V$ and audio tracks $124_{A1}$ to $124_{A3}$ being displayed in the group clip time line part 122 of the group clip time line window 120 in correspondence with the clip are all deleted.

Figure 25:
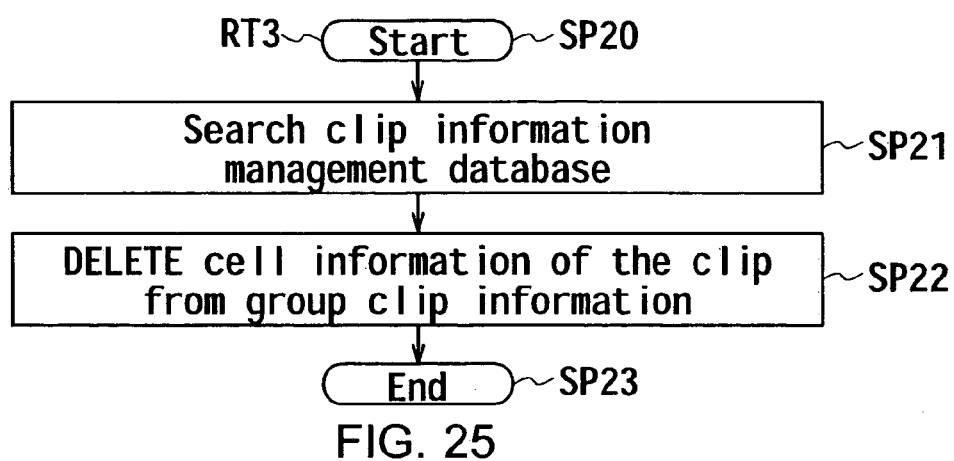
FIG. 25 is a flowchart showing a clip deletion procedure.

At this time, the CPU 20 executes an internal process to delete the clip from the group clip, with a clip deletion procedure RT3 shown in FIG. 25.

That is, when "Delete" of the context menu is selected, the CPU 20 starts this clip addition procedure RT3 from step SP20, and at next SP21, the CPU 20 searches the clip information management database for the clip information of the group clip.

Then the CPU 20 moves on to step SP22 to delete the cell information of the clip from the storage region storing the clip information of the group clip of the clip information management database. As a result, the clip has been deleted from the group clip in the editing apparatus 2. Then the CPU 20 moves on to step SP23 where this clip deletion procedure RT3 is completed.

(4-3) Effect Setting to each Clip belonging to Group Clip

On the other hand, the operator can individually set effects to each clip in a group clip in the following manner.

That is, the operator puts a target group clip in the group clip time line part 122 of the group clip time line window 120 as described above, and then displays the FX explorer window 80 described above with reference to FIG. 9 on the display 13 by clicking the FX button 131 of the button group 130 provided at the upper part of the group clip time line part 122 as shown in FIG. 16.

Figure 26:
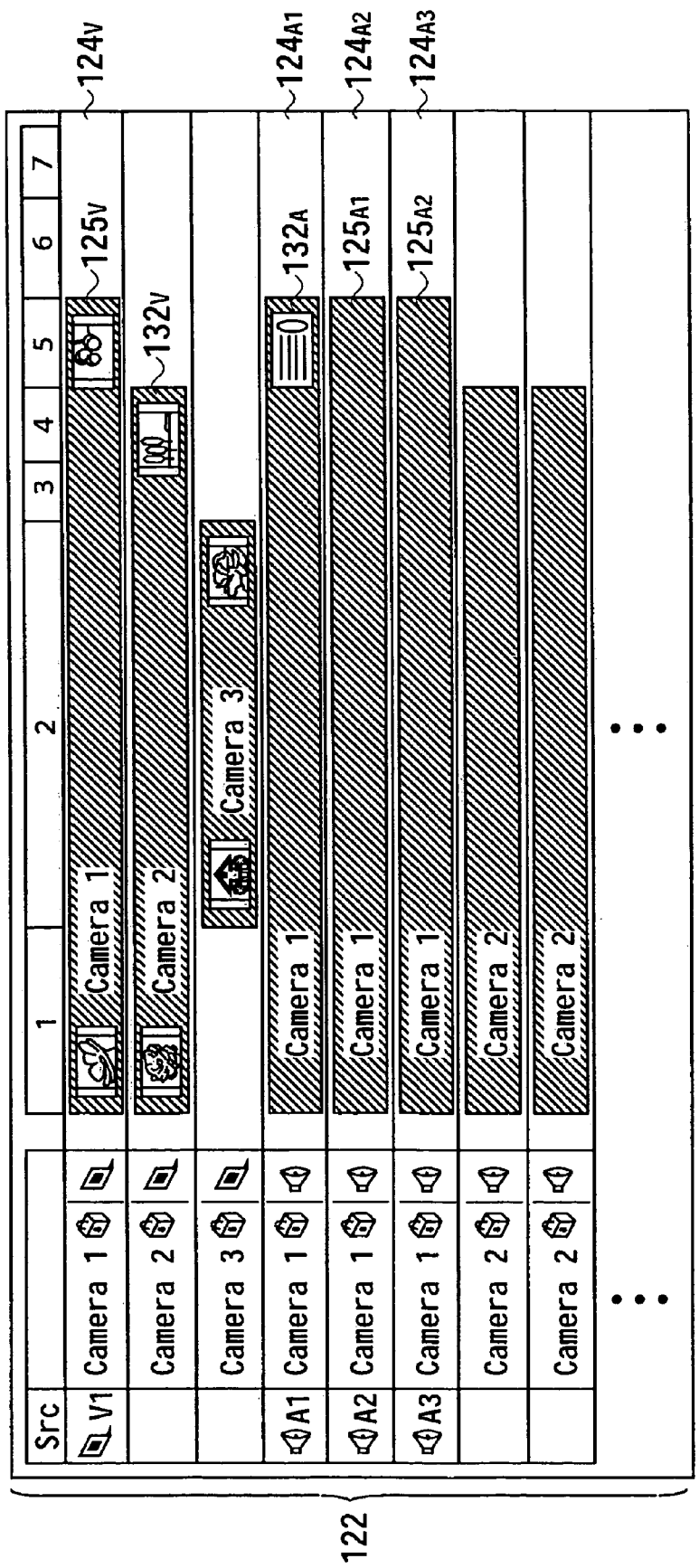
FIG. 26 is a schematic diagram explaining effect setting to a clip in a group clip.

Then the operator selects a video effect icon 83 corresponding to a desired video special effect (color adjustment, negative-positive conversion) out of various video effect icons 83 being displayed on this FX explorer window 80, and pastes this video effect icon 83 onto a clip bar 125 being displayed on the video track $124_V$ of the clip in the group clip time line part 122 by drop and drug as shown in FIG. 26.

As a result, as to the clip to which the video effect icon $132_V$ has been pasted onto the clip bar $125_V$, the video special effect corresponding to the video effect icon $132_V$ is set by default.

In addition, at this time, the setting contents are reflected in the main image of the clip being displayed in the source viewer part 121.

Further, as to the clip to which the video special effect has been set as described above, when it is desired that the contents of the video special effect is adjusted into a desired state, just double-click the video effect icon $132_V$ which has been pasted onto the clip bar $125_V$ of the clip. As a result, a window or dialog for adjusting the video special effect corresponding to the video effect icon $132_V$ is displayed on the display 13 (FIG. 1). Thus the operator can set various setting to the video special effect on this window or dialog.

Figure 27:
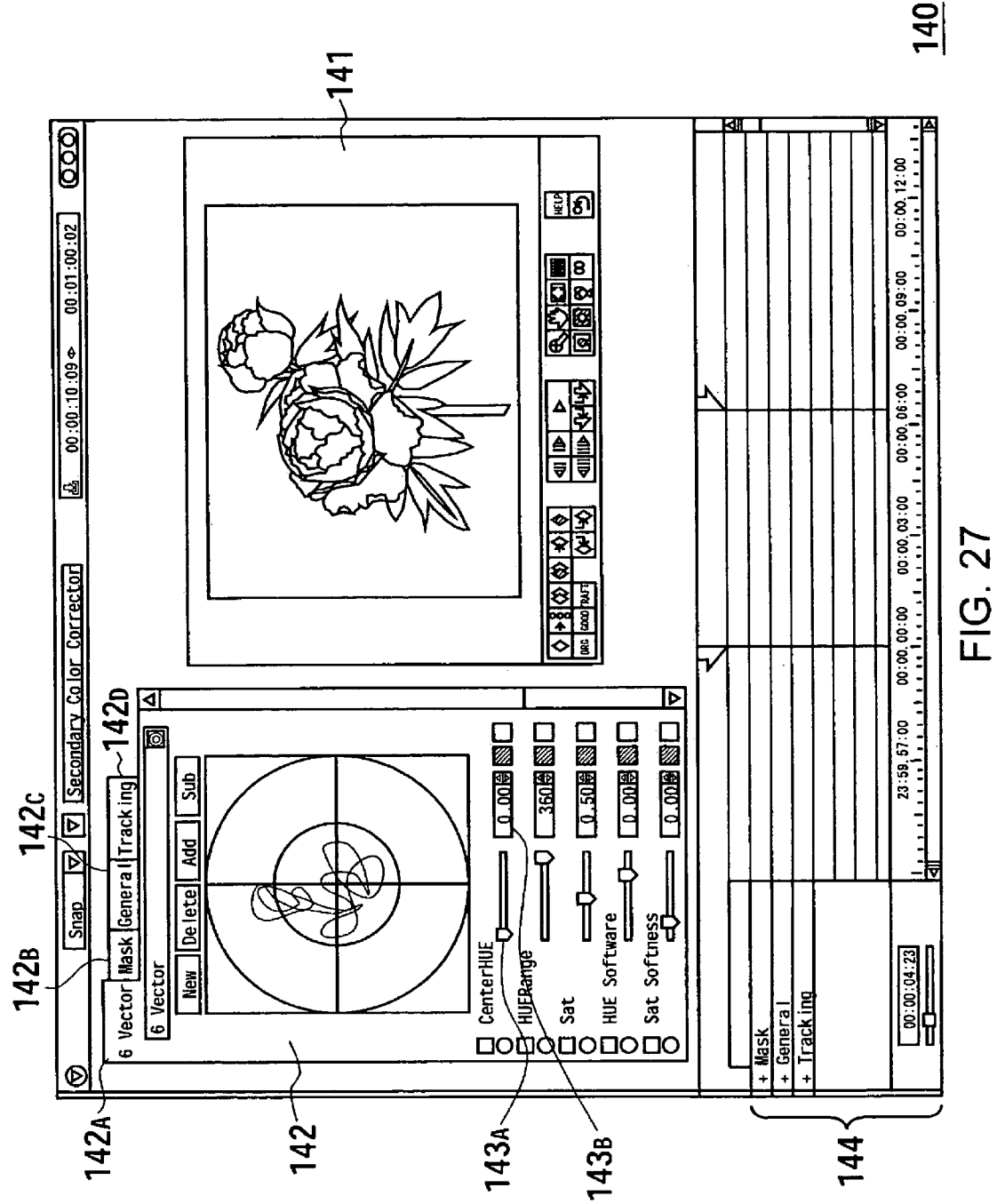
FIG. 27 is a schematic diagram showing an effect editor window.

For example, in a case where the video effect icon $132_V$ is for color adjustment, an effect editor window 140 as shown in FIG. 27 is displayed on the display 13 (FIG. 1). This effect editor window 140 is composed of a source viewer part 141 for displaying the video of a corresponding clip, a tub display part 143 for displaying tubs 142A to 142D for performing various setting, and a setting time line part 144 for setting so as to execute a desired video special effect at desired timing on a time axis.

Then the user can change various parameters regarding the color of the video of the clip by using the tubs 142A to 142D. For example, in a "6 Vector" tub shown in FIG. 27, a slider 143A and a text box 143B are provided for each of "Center HUE" which is a central value of a color of a color component to be changed, "HUE Range" which is a range of the color of the color component to be changed, "Set" which is color saturation of the color component to be changed, "HUE Softness" which is a degree of graduation of a boundary of the range of the color of the color component to be changed, "Sat Softness" which is a degree of graduation of a boundary of the range of the color saturation of the color component to be changed, "Lumi Softness" which is a degree of graduation of a boundary of the range of brightness of the color component to be changed, and "Target Color HUE" which is a central value of the color of the color component after change. By sliding the slider 143A or directly entering a desired value in the text box 143B, the parameter value of a corresponding item can be changed and set.

Further, as to audio effects (acoustic special effects), by selecting "Set Audio Effect" from a context menu (not shown) which is displayed by the right click on the clip bar $125_{A1}$ to $125_{A3}$ of a desired audio channel of a desired clip being displayed in the group clip time line part 122 of the group clip time line window 120 (FIG. 16), an icon (hereinafter, referred to as an audio effect icon) $132_A$ for the audio effect (audio special effect) can be displayed on the clip bar $125_{A1}$ to $125_{A3}$ as shown in FIG. 26. Note that the audio effect has not been set at this stage.

Figure 28:
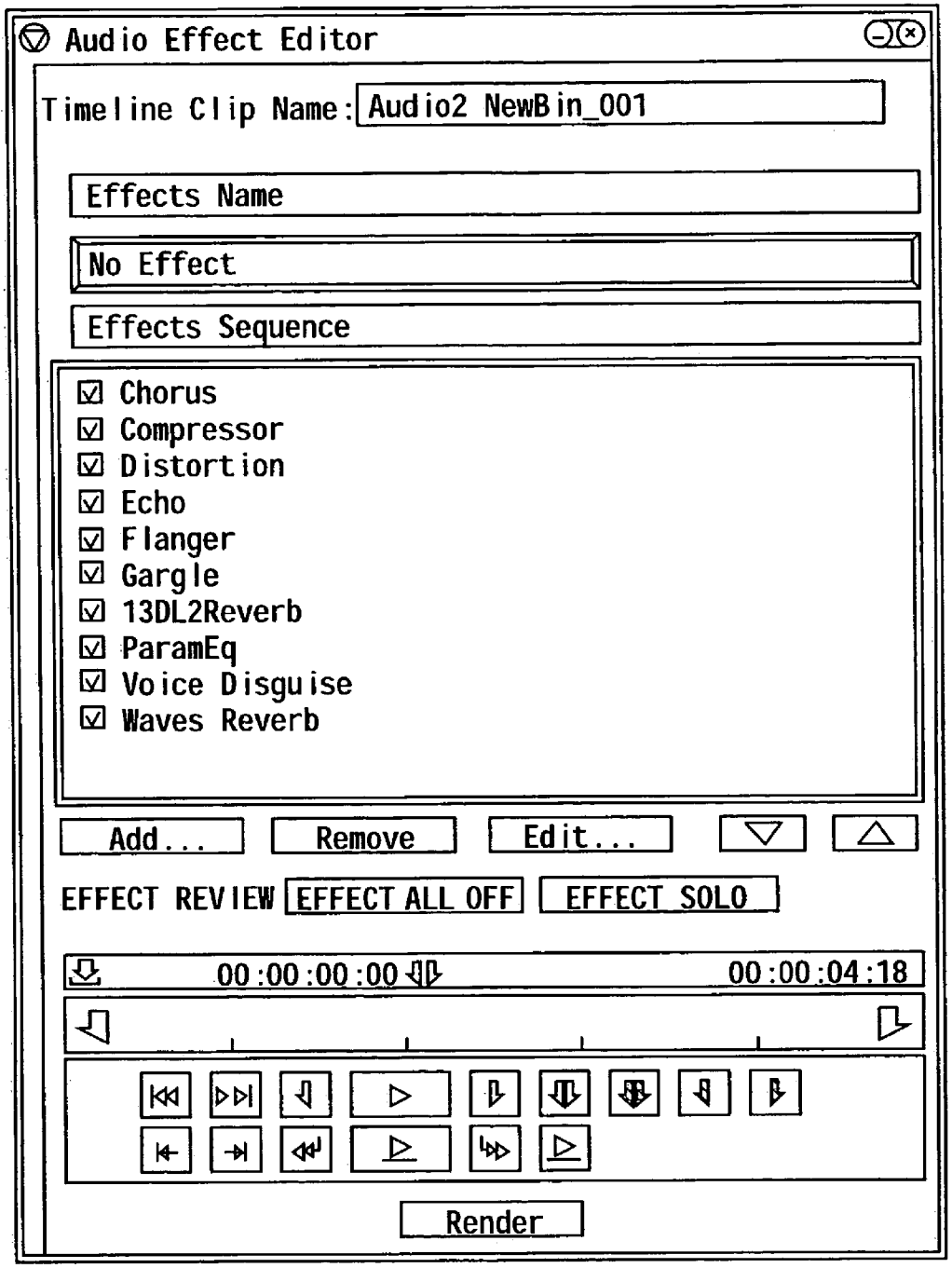
FIG. 28 is a schematic diagram showing an audio effect editor dialog.

In a case of actually setting the audio effect, by double-clicking the audio video effect icon $132_A$ being displayed on the clip bar $125_{A1}$ to $125_{A3}$ being displayed on the audio track $124_{A1}$ to $12_{A3}$ of the group clip time line part 122. As a result, an audio effect editor dialog 150 as shown in FIG. 28 is displayed on the display 13.

Then on this audio effect editor dialog 150, the operator can set various audio effects such as "Chorus" effect to thicken sounds by temporally shifting the original waveform, "Compressor" effect to compress the dynamic range of an audio signal, "Distortion" effect to create or erase components which do not exist in the original signal, "Echo" effect to temporally delay sounds which are the same as the original sounds, "Flanger" effect which occurs by adding slightly delayed sounds and changing the delay time, "Gargle" effect to create sounds like gargling, "Reverb" effect to artificially add reverberant sounds, "ParamEq" to desirably set the amount of boost or cut, and the sharpness (Q) of the frequency characteristics which are not fixed, and "Waves Reverb" effect to artificially add reverberant sounds like waves.

Figure 29:
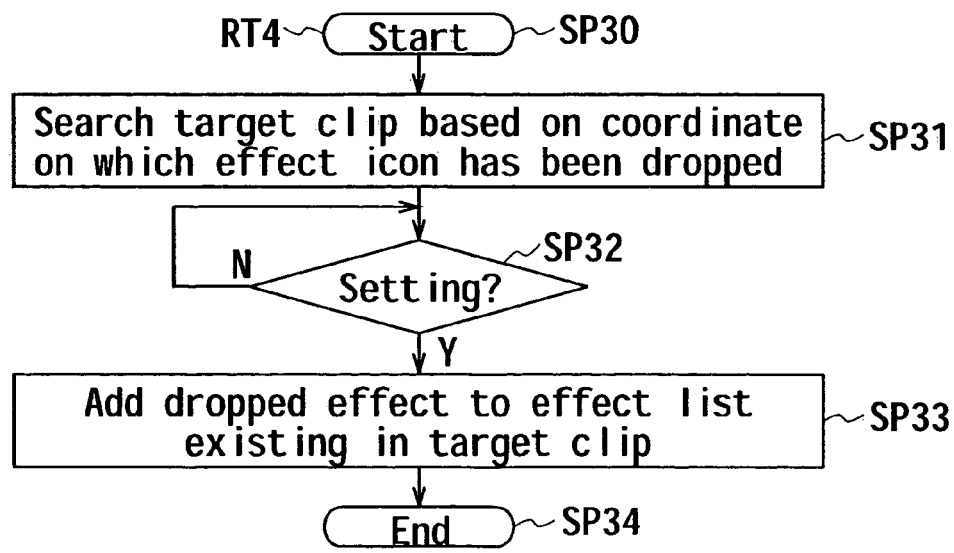
FIG. 29 is a flowchart showing an effect setting procedure.

At this time, the CPU 20 execute an internal process to perform the effect setting for each clip of the group clip with an effect setting procedure RT4 as shown in FIG. 29.

That is, when the user pastes a video effect icon $132_V$ onto a clip bar 125 being displayed on the video track $124_V$ of the group clip time line part 122 of the group clip time line window 120, opens the effect editor window 140, or open the audio effect editor dialog 150, the CPU 20 starts this effect setting procedure RT4 from step SP30.

At next step SP31, the CPU 20 specifies a target clip based on the coordinate to which the video effect icon $132_V$ or the audio effect icon $132_A$ has been dropped, and searches the clip management database being stored in the hard disk drive 28 (FIG. 2), based on the clip ID of the clip for the cell information of the clip.

Then the CPU 20 moves on to step SP32 to determine whether the effect should be set to the clip, and when a negative result is obtained, it waists for timing to set the effect.

When an affirmative result is obtained at step SP32 because the video effect icon $132_V$ has been pasted by drug and drop onto a clip bar 125 being displayed on the video track $124_V$ of the group clip time line part 122 or the effect editor window 140 or the audio effect editor dialog 150 is closed, the CPU 20 moves on to step SP to set the video special effect by defect or take in the setting contents of the effect set on the effect editor window 140 or the audio effect editor dialog 150 and register the contents in the above-described effect list included in the cell information of the clip. As a result, the effect has been set to the clip in the editing apparatus 2. Then the CPU 20 moves on to step SP34 where this effect setting procedure RT4 is completed.

As described above, in this editing system, a clip can be added or deleted to/from a group clip or effects can be set to each clip in the group clip.

(5) Operation and Effects of this Embodiment

With the above-configuration, after a group clip is created, the computer 4 of the editing apparatus 2 displays the group clip time line window 120 (FIG. 16) where the group clip is puts in the group clip time line part 122 (FIG. 16) according to user operation.

In addition, according to prescribed operation on the group clip time line window 120, the computer 4 executes a process to add a new clip to this group clip or delete a clip specified out of the clips belonging to the group clip, and manages the contents of a special effect set to a specified clip out of the clips belonging to the group clip, in correspondence with the clip.

Accordingly, in this editing system 1, the addition/deletion of a clip belonging to a group clip and special effect setting to each clip belonging to the group clip can be performed as desired. Therefore, even after the group clip is created, such operation can be performed without recreating the group clip, thus significantly improving efficiency of editing work.

Further, in this editing system 1, the addition/deletion of a clip to/from a group clip and-effect setting to each clip can be performed on the basis of the concept of a time line which is used in conventional editing apparatuses. Therefore, a user does not have to study new operation, thus resulting in good operability and visibility of such work.

Furthermore, since the contents of a group clip are displayed by being put on the time line, the user can visually confirm the states of each clip. In addition, each clip is visually displayed along the time line, the positions of materials can be adjusted easily, resulting in simplifying editing work and thus reducing time for editing work.

According to the above configuration, after a group clip is created, a group clip time line window 120 (FIG. 16) where the group clip is put in the group clip time line part 122 (FIG. 16) is displayed according to user operation. After that, according to prescribed operation on the group clip time line window 120, a process to add a new clip to this group clip or delete a clip specified out of clips belonging to the group clip is performed, and the contents of special effects set to a specified clip out of the clips belonging to the group clip are managed in correspondence with the clip. Therefore, after a group clip is created, such work can be done without recreating the group clip and also such work can be done with good operability and visibility, thus making it possible to realize an editing system capable of significantly improving working efficiency of editing work.

(6) Other Embodiments

Note that the above-described embodiment has described a case where this invention is applied to a nonlinear editing apparatus (editing system 1). This invention, however, is not limited to this and can be widely applied to various kinds of editing apparatuses.

Further, the above-described embodiment has described a case where the video tracks $125_V$ and the audio tracks $124_{A1}$ to $124_{A3}$ in the group clip time line part 122 of the group clip time line window 120 are displayed in an arrangement as shown in FIG. 16. This invention, however, is not limited to this and the arrangement of the video tracks $124_V$ and the audio tracks $124_{A1}$ to $124_{A3}$ can be switched as desired as shown in FIG. 30 or FIG. 31.

Figure 30:
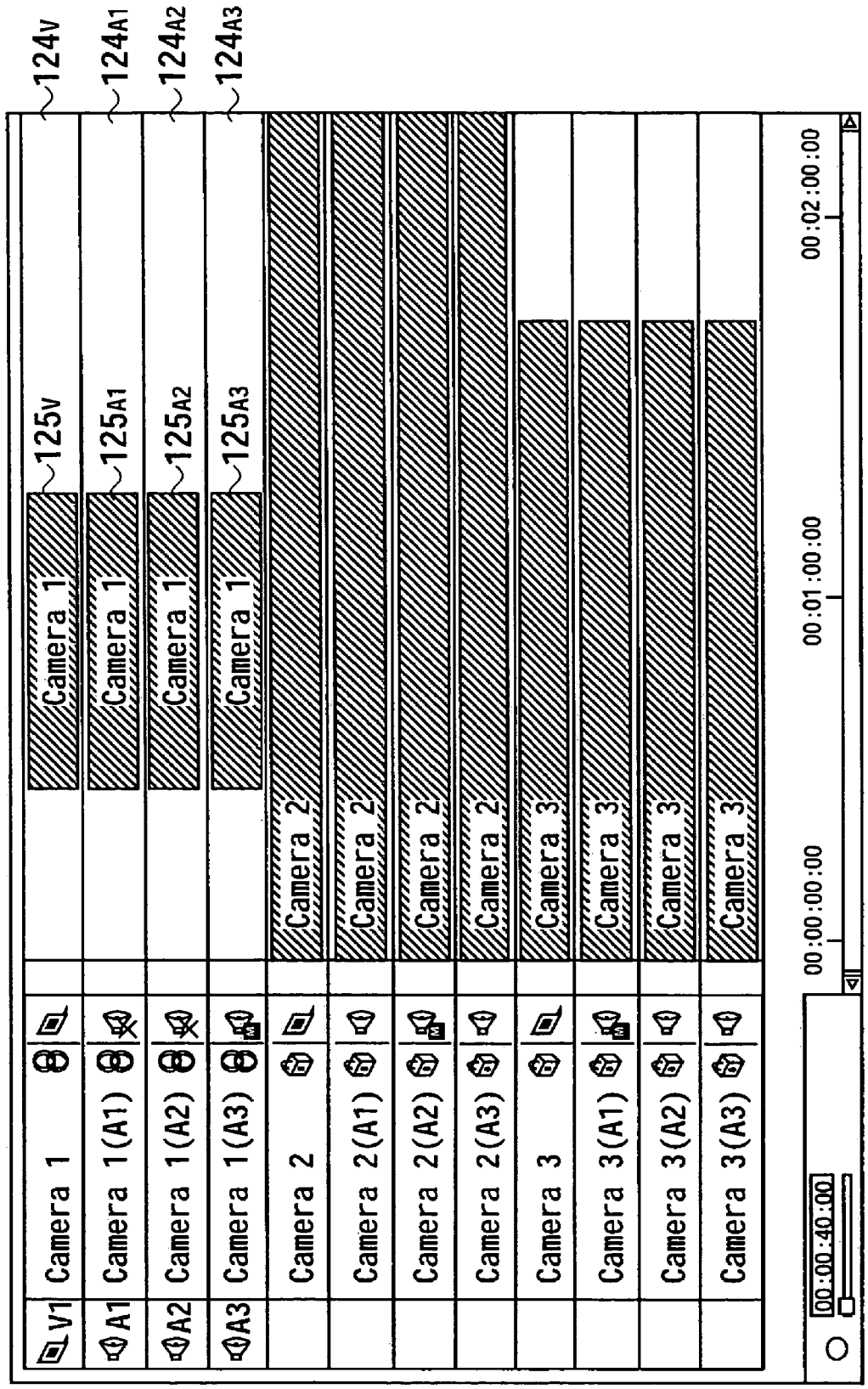
FIG. 30 is a schematic diagram explaining how to switch display in a group clip time line part of the group clip time line window.
Figure 31:
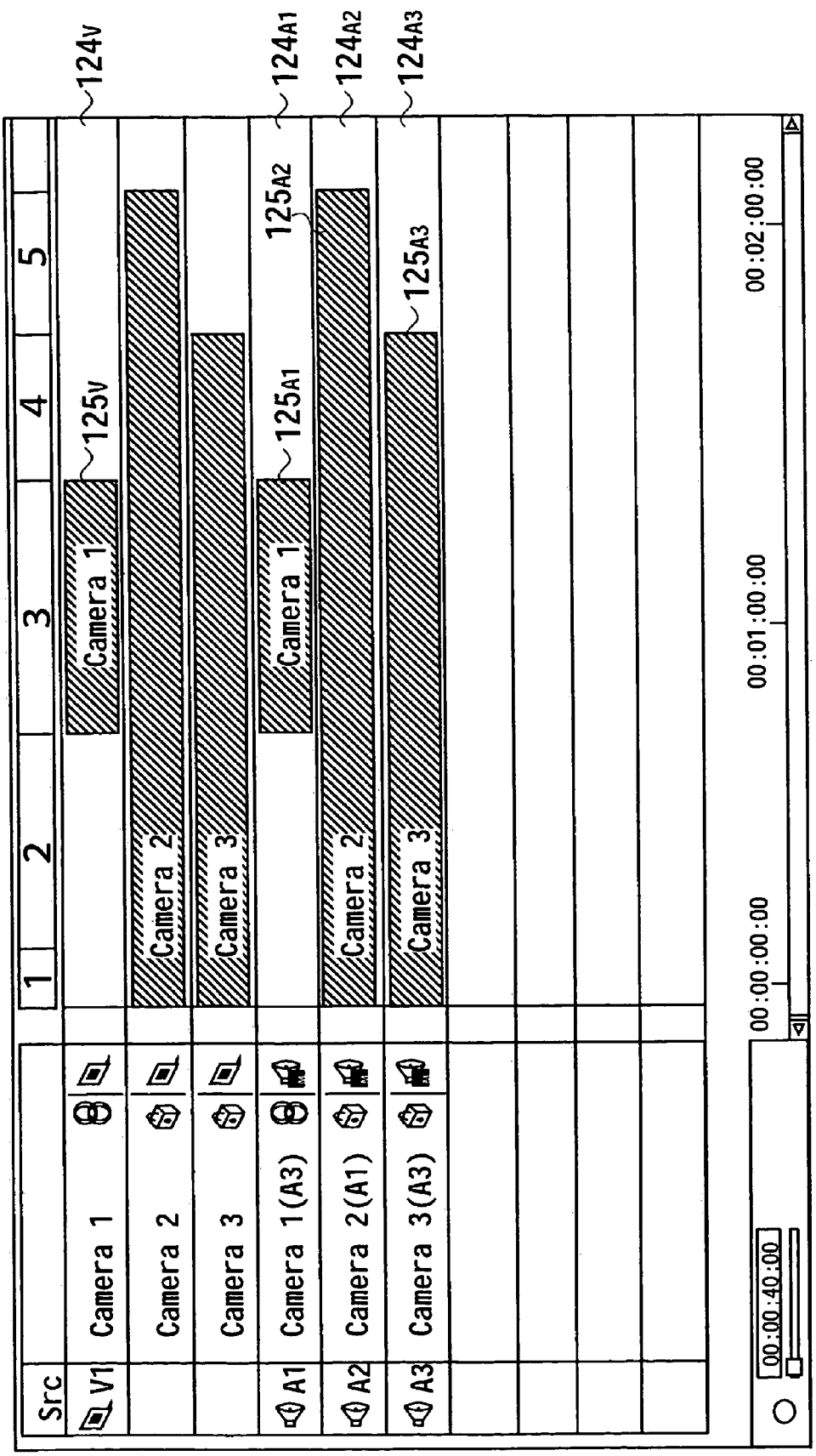
FIG. 31 is a schematic diagram explaining show to switch display in the group clip time line part of the group clip time line window.

In this case, FIG. 30 shows a display pattern to collectively display the video tracks $124_V$ and the audio tracks $124_{A1}$ to $124_{A3}$ on a clip basis. FIG. 31 is a display pattern, regarding to the audio tracks $124_{A1}$ to $124_{A3}$, to only display one master audio track $124_{A1}$ to $124_{A3}$ previously set, not to display the audio tracks $124_{A1}$ to $124_{A3}$ for each clip. Note that the master audio track $124_{A1}$ to $124_{A3}$ is used to specify a clip of which the audio is used as a basis, and the audio track $124_{A1}$ to $124_{A3}$ for the audio of a clip set in "Timecode of Group Clip from" of the group clip creator 111 corresponds to this.

Since the arrangement of the video tracks $124_V$ and the audio tacks $124_{A1}$ to $124_{A3}$ in the group clip time line part 122 of the group clip time line window 120 can be switched as desired, GUI which is easy to become complicated, can be organized, so as to perform desired editing easily.

Furthermore, according to the above-described embodiment, a program to cause the computer 4 to execute the above processes is stored in the ROM 21 of the computer 4. This invention, however, is not limited to this and it can be stored in a recording medium (including mobile type) other than the ROM and given to the computer 4.

Furthermore, according to the above-described embodiment, the group clip time line window 120 can be formed as shown in FIG. 16. This invention, however, is not limited to this and graphical user interfaces having other various structures can be widely applied.

Furthermore, according to the above-described embodiment, the video material is video/audio material. This invention is not limited to this and can be applied to a case where the video material is video material comprising only video information or is audio material comprising only audio information.

This invention can be widely applied to various kinds of editing apparatuses in addition to nonlinear editing apparatuses. In addition, this invention can be applied as an application for personal computers which are used for purposes other than editing.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An editing apparatus comprising:
management means for managing as one group a plurality of video materials specified from the video materials, the plurality of video materials forming a group clip having a plurality of video clips, wherein each of the video clips within the group clip include video and corresponding audio tracks associated with one of a plurality of cameras, the group clip created based on setting from a group clip creator dialog window:
a clip alignment associated with displaying a plurality of clip bars for each of the plurality of video clips within the group clip,
a number of the audio tracks provided within the group clip time line,
a start margin for establishing a duration between a beginning and a first clip of the plurality of video clips within the group clip, and
a time code corresponding to the group clip; and
display control means for displaying information on each of the video materials belonging to the group clip as a graphical user interface according to a first operation, wherein
the management means executes a process to add new video material to the group clip or delete video material belonging to the group clip according to a second operation.

2. The editing apparatus according to claim 1, wherein the management means manages contents of a special effect set for the video material specified from the video materials belonging to the group in correspondence with the video material.

3. The editing apparatus according to claim 1, wherein:
the graphical user interface has a time line; and
the display control means puts and displays information on each of the video materials belonging to the group on the time line.

4. The editing apparatus according to claim 3, wherein the display control means displays videos of a plurality of the video materials belonging to the group in a split-screen display mode, together with the time line.

5. The editing apparatus according to claim 4, wherein the display control means displays a window of a changeable size where videos of a plurality of the video materials belonging to the group are displayed in a split-screen display mode, differently from a window displaying the time line.

6. The editing apparatus according to claim 4, comprising input means provided with a numeric key pad for entering various commands, wherein
the display control means displays a played video of the video material specified from the video materials belonging to the group, and when one key from the numeric keypad is pressed, switches the played video to a played video of the video material being displayed at a display position which is the same as a position corresponding to the key pressed from the numeric keypad, from a plurality of the video materials of which videos are displayed in the split-screen display mode.

7. The editing apparatus according to claim 3, wherein the display control means switches a display pattern of tracks corresponding to the video materials on the time line to another display pattern according to third operation.

8. An editing method, comprising:
a first step of managing as one group a plurality of video materials specified from the video materials, the plurality of video materials forming a group clip having a plurality of video clips, wherein each of the video clips within the group clip include video and corresponding audio tracks associated with one of a plurality of cameras, the group clip created based on setting from a group clip creator dialog window:
a clip alignment associated with displaying a plurality of clip bars for each of the plurality of video clips within the group clip,
a number of the audio tracks provided within the group clip time line,
a start margin for establishing a duration between a beginning and a first clip of the plurality of video clips within the group clip, and
a time code corresponding to the group clip;
a second step of displaying information on each of the video materials belonging to the group clip as a graphical user interface according to first operation; and
a third step of executing a process to add new video material to the group clip or delete the video material belonging to the group clip, according to second operation.

9. The editing method according to claim 8, comprising a fourth step of managing contents of a special effect set for the video material specified from the video materials belonging to the group in correspondence with the video material.

10. A non-transitory recording medium recording a program causing a computer to execute:
a first step of managing as one group a plurality of video materials specified from the video materials, the plurality of video materials forming a group clip having a plurality of video clips, wherein each of the video clips within the group clip include video and corresponding audio tracks associated with one of a plurality of cameras, the group clip created based on setting from a group clip creator dialog window:
a clip alignment associated with displaying a plurality of clip bars for each of the plurality of video clips within the group clip,
a number of the audio tracks provided within the group clip time line,
a start margin for establishing a duration between a beginning and a first clip of the plurality of video clips within the group clip, and
a time code corresponding to the group clip;
a second step of displaying information on each of the video materials belonging to the group clip as a graphical user interface according to first operation; and
a third step of executing a process to add new video material to the group clip or delete the video material belonging to the group clip, according to second operation.

11. The non-transitory recording medium according to claim 10, further comprising a fourth step of managing contents of a special effect set for the video material specified from the video materials belonging to the group in correspondence with the video material.

12. An editing apparatus comprising:
a managing unit managing as one group a plurality of video materials specified from the video materials, the plurality of video materials forming a group clip having a plurality of video clips, wherein each of the video clips within the group clip include video and corresponding audio tracks associated with one of a plurality of cameras, the group clip created based on setting from a group clip creator dialog window:

a clip alignment associated with displaying a plurality of clip bars for each of the plurality of video clips within the group clip, a number of the audio tracks provided within the group clip time line, a start margin for establishing a duration between a beginning and a first clip of the plurality of video clips within the group clip, and a time code corresponding to the group clip; and a display controller displaying information on each of the video materials belonging to the group clip as a graphical user interface according to first operation, wherein the managing unit executes a process to add new video material to the group clip or delete the video material belonging to the group clip according to second operation.

13. The editing apparatus according to claim 12, wherein the managing unit manages contents of a special effect set for the video material specified from the video materials belonging to the group in correspondence with the video material.

* * * * *